(12) United States Patent
Chernyshou et al.

(10) Patent No.: US 10,071,594 B2
(45) Date of Patent: Sep. 11, 2018

(54) CHALK LINE DEVICE

(71) Applicant: STANLEY BLACK & DECKER INC., New Britain, CT (US)

(72) Inventors: Aliaksei Chernyshou, Farmington, CT (US); Charles L. Thierfeld, Portland, CT (US); Michael T. Matteo, West Hartford, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 163 days.

(21) Appl. No.: 14/971,731

(22) Filed: Dec. 16, 2015

(65) Prior Publication Data
US 2016/0167425 A1   Jun. 16, 2016

Related U.S. Application Data

(60) Provisional application No. 62/092,606, filed on Dec. 16, 2014.

(51) Int. Cl.
*B44D 3/38* (2006.01)
*C09D 13/00* (2006.01)

(52) U.S. Cl.
CPC ............... *B44D 3/38* (2013.01); *C09D 13/00* (2013.01)

(58) Field of Classification Search
CPC .................................. B44D 3/38; C09D 13/00
USPC .......................................................... 33/414
See application file for complete search history.

(56) References Cited

U.S. PATENT DOCUMENTS

| 1,373,884 | A | * | 4/1921 | Gregory | B44D 3/38 |
| | | | | | 33/414 |
| 2,398,805 | A | | 4/1946 | Pomeroy | |
| 3,016,616 | A | | 1/1962 | Matson | |
| 3,099,091 | A | | 7/1963 | Hindall | |

(Continued)

FOREIGN PATENT DOCUMENTS

| CN | 2163067 | 4/1994 |
| CN | 1165842 | 11/1997 |

(Continued)

OTHER PUBLICATIONS

Extended Search Report, including Search Opinion, issued in corresponding European Patent Application No. 15200155.8, dated Aug. 10, 2016.

(Continued)

*Primary Examiner* — R. A. Smith
(74) *Attorney, Agent, or Firm* — Pillsbury Winthrop Shaw Pittman LLP

(57) ABSTRACT

A chalk line device that includes a housing, a reel mounted for rotation within the housing, a liquid container disposed within the housing, and a handle connected with the reel and extending outside the housing is provided. The reel is constructed and arranged to carry a chalk line wound thereon. The reel is positioned in the liquid container such that the chalk line wound therein is at least partially submerged in the liquid chalk received in the liquid container. The liquid container has a sealed configuration and an unsealed configuration. In the unsealed configuration, the liquid container is configured to receive liquid chalk therein. In the sealed configuration, the liquid container substantially seals the liquid chalk received therein. The handle is operable to wind up the chalk line onto the reel.

22 Claims, 18 Drawing Sheets

(56) References Cited

U.S. PATENT DOCUMENTS

| | | | |
|---|---|---|---|
| 3,468,611 A | 9/1969 | Ward | |
| 3,674,729 A | 7/1972 | Mirick | |
| 3,691,639 A | 9/1972 | Roeseler et al. | |
| 3,721,009 A | 3/1973 | Lucich | |
| 4,507,422 A | 3/1985 | Farrar et al. | |
| 4,554,307 A | 11/1985 | Farrar et al. | |
| 4,606,134 A | 8/1986 | Flick | |
| 4,926,562 A * | 5/1990 | Hwu | B25H 7/045 33/414 |
| 5,336,307 A | 8/1994 | Horvat et al. | |
| 5,352,279 A | 10/1994 | Fusi et al. | |
| 5,594,045 A | 1/1997 | Alexiou | |
| 5,726,221 A | 3/1998 | Alexiou | |
| 5,726,233 A | 3/1998 | Mitchell et al. | |
| 5,856,398 A | 1/1999 | Oizumi et al. | |
| 5,972,421 A | 10/1999 | Finley | |
| 6,120,590 A | 9/2000 | Miyamoto et al. | |
| 6,203,602 B1 * | 3/2001 | Rangell | C09D 13/00 106/31.01 |
| 6,289,597 B1 | 9/2001 | Beyers | |
| 6,488,429 B2 | 12/2002 | Korper | |
| 6,572,297 B2 | 6/2003 | Korper | |
| 6,610,129 B1 | 8/2003 | Sader et al. | |
| 6,826,845 B2 | 12/2004 | Pritchard | |
| 6,915,587 B1 | 7/2005 | Scillia et al. | |
| 7,299,558 B2 | 11/2007 | Wang | |
| 7,758,268 B2 | 7/2010 | Kugel et al. | |
| 7,913,408 B2 | 3/2011 | Grisham | |
| 8,414,218 B1 | 4/2013 | Gelardi et al. | |
| 8,713,810 B2 | 5/2014 | Spaulding | |
| 8,822,580 B2 | 9/2014 | Korenkiewicz et al. | |
| 8,888,906 B2 | 11/2014 | Yamaguchi et al. | |
| 2006/0037980 A1 | 2/2006 | Nepil | |
| 2006/0062630 A1 | 3/2006 | Yeh | |
| 2006/0185185 A1 | 8/2006 | Scarborough | |
| 2007/0068021 A1 | 3/2007 | Fisher | |
| 2007/0240320 A1 | 10/2007 | Hickey et al. | |
| 2008/0236442 A1 | 10/2008 | Spaulding et al. | |
| 2008/0295347 A1 * | 12/2008 | Braham | B44D 3/38 33/414 |
| 2008/0301960 A1 | 12/2008 | Nepil et al. | |
| 2009/0097904 A1 | 4/2009 | Dubuc et al. | |
| 2013/0180430 A1 | 7/2013 | Yamaguchi et al. | |
| 2014/0011934 A1 | 1/2014 | Bouzid et al. | |
| 2014/0319412 A1 | 10/2014 | Gane et al. | |

FOREIGN PATENT DOCUMENTS

| | | |
|---|---|---|
| CN | 1453148 | 11/2003 |
| CN | 2754896 | 2/2006 |
| CN | 101085584 | 12/2007 |
| CN | 101457055 | 6/2009 |
| CN | 101559689 | 10/2009 |
| CN | 101580666 | 11/2009 |
| CN | 201456670 | 5/2010 |
| CN | 101885930 | 11/2010 |
| CN | 201960903 | 9/2011 |
| CN | 102673247 | 9/2012 |
| CN | 102757696 | 10/2012 |
| EP | 2 420 390 A1 | 2/2012 |
| GB | 18557 A | 10/1909 |
| GB | 2 448 048 A | 10/2008 |
| KR | 2000-0025376 | 5/2000 |
| KR | 10-2011-0007797 | 1/2011 |
| KR | 10-2012-0119723 | 10/2012 |
| KR | 10-2013-0021543 | 3/2013 |

OTHER PUBLICATIONS

Partial Search Report issued in corresponding European Patent Application No. 15200155.8, dated May 3, 2016.
"ZooYoo Original Liquid Chalk Pen Available Writing Words on Vinyl Chalkboard Sticker for Baby Gigt", retrieved from the Internet on Jul. 26, 2016: <URL: http://zooyoo.en.alibaba.com/product/1298329602-218854901/ZooYoo_Original_Liquid_Chalk_Pen_Available_Writing_Words_On_Vinyl_Chalkboard_Sticker_For_Baby_Gigt.html, 10 pages.
"NeoChalk Liquid Chalk Marker Chisel Tip-Set of 8", retrieved from the Internet on Dec. 16, 2015: <URL:http://www.amazon.com/NeoChalk-Liquid-Chalk-Marker-Tip-Set/dp/B0019FJQOQ>.
"6pcs 3mm Highlighter Fluorescent Liquid Chalk Marker Pen for LED Writing Memo Board/Glass decorating Sign" by BrainyTrade, retrieved from the Internet on Dec. 16, 2015: <URL: http://www.amazon.com/Highlighter-Fluorescent-Liquid-Writing-decorating/dp/B00N1K55BA/ref=sr_1_18?s=hi&ie=UTF8&qid=1418404478&sr=1-18&keywords=liquid+chalk>.
"Chalk Markers" by Comfty Home, retrieved from the Internet on Dec. 16, 2015: <URL: http:/lcomftyhome.com/products/chalk-markers>.
"Liquid Grip" by Rogue, Retrieved from the Internet: <URL: http://www.roguefitness.com/liquid-grip>, on Dec. 16, 2015.
"Erasable Liquid Chalk-White" by Matha Stewart Crafts, retrieved from the Internet on Dec. 16, 2015: <URL: http://www.joann.com/martha-stewart-crafts-2oz-erasable-liquid-chalk---white/13443700.html>.
"Water-Based Liquid Chalk Window Marker-White" by Darice, retrieved from the Internet on Dec. 16, 2015: <URL: http://www.walmart.com/ip/Water-Based-Liquid-Chalk-Window-Marker-White/32851456>.
"Liquid Chalk Markers, 3/16" Chisel Tip—Set of 8 Neon Colors" by Displays2go, retrieved from the Internet on Dec. 16, 2015: <URL: http://www.displays2go.com/P-13107/Liquid-Chalk-Marker-with-Set-of-8>.
"Mammut Liquid Chalk" by Mammut, retrieved from the Internet on Dec. 16, 2015: <URL: http://www.backcountry.com/mammut-liquid-chalk-200ml>.
"Liquid Chalk Wet Wipe" by The Rainbow Liquid Chalk Specialists, retrieved from the Internet on Dec. 16, 2015: <URL: https://www.rainbowchalk.com/product/assort-wet-wipe-5mm-c-liquid-chalk/>.
"Uchida Bistro Chalk Marker Set 4/Pkg-Fluorescent Blue/Red/Green/Yellow" by Marvy Uchida, retrieved from the Internet on Dec. 16, 2015: <URL: http://www.staples.com/Uchida-Bistro-Chalk-Marker-Set-4-Pkg-Fluorescent-Blue-Red-Green-Yellow/product_943479>.

* cited by examiner

CHALK LINE DEVICE

CROSS REFERENCE TO RELATED APPLICATION

This application claims priority to U.S. Provisional Application No. 62/092,606, filed Dec. 16, 2014, which is hereby incorporated by reference in its entirety.

FIELD

The present patent application relates to a chalk line device and liquid chalk therefor.

BACKGROUND

Chalk line devices are widely employed to mark straight chalk lines on surfaces on a work piece or a work place. Generally, the chalk line device includes a housing or casing which defines a reservoir for storing chalk and stores an extendable chalk line about a spool that is driven by a crank mechanism outside of the housing. Chalk line devices use a chalk material (e.g., finely powdered) which is applied to the chalk line within the housing. The chalk material may be white or colored brightly so as to allow the user to distinguish a mark line from a surface color of the work piece/work place. The chalk line typically terminates with a clip or a hook. The clip or hook facilitates securing the chalk line to an object or the work piece, and may also act as a stop against a wall of the housing to prevent the end of the chalk line from entering inside the housing during rewinding or retraction of the chalk line.

To mark a straight chalk line using a chalk line device, a chalk material is applied to the chalk line, generally from a chalk material stored in the reservoir of the chalk line device, and the chalk line with the chalk material thereon is pulled taut along the desired straight line, and the taut chalk line is "snapped" to leave a straight line of chalk material/powder on the surface of the work piece or work place. The chalk line device may be filled with additional chalk material when the chalk material runs out.

The present disclosure provides improvements over prior art chalk line devices.

SUMMARY

One aspect of the present patent application provides a chalk line device that includes a housing, a chalk line support mounted in the housing, a chalk line, a retractor and a valve. The housing has a chalk line opening, a chalk receptacle and a chalk reservoir into which chalk is stored when received from the chalk receptacle. The chalk line is operatively connected with the chalk line support and is arranged to extend through the chalk line opening. The retractor is mounted to the housing and is operable to retract the chalk line into the housing and allow the chalk line to be extended from the housing through the chalk line opening. The valve is operatively associated with the chalk receptacle. The valve is movable between a first position in which the valve is configured to substantially seal the chalk receptacle and a second position in which the valve is configured to be open to enable the chalk to be introduced to the chalk reservoir through the chalk receptacle. The valve has sealing surfaces configured to seal with a nozzle of a chalk bottle for providing chalk to the chalk receptacle.

Another aspect of the present patent application provides a chalk line device that includes a housing having a chalk line housing opening, a main chalk reservoir in the housing in which chalk can be stored, the main chalk reservoir having a main chalk reservoir opening, a chalk line support mounted in the housing, a chalk line, a retractor and a secondary chalk reservoir. The chalk line is operatively connected with the chalk line support and is arranged to extend through the chalk line housing opening. The retractor is mounted to the housing and is operable to retract the chalk line into the housing and allow the chalk line to be extended from the housing through the chalk line housing opening. The secondary chalk reservoir is operatively disposed between the main chalk reservoir and the chalk line housing opening in the housing. The chalk line passes through the main chalk reservoir opening before passing through the chalk line housing opening when the chalk line is extended from the housing. The secondary chalk reservoir is configured to capture excess chalk deposited on the chalk line before the chalk line exits the housing through the chalk line housing opening.

Another aspect of the present patent application provides a chalk line device that includes a housing, a cartridge assembly connectable to the housing, the cartridge assembly comprising a cartridge housing having an opening, a chalk line support carried by the cartridge housing, a chalk line, and a lock arrangement. The housing has a retractor operatively connected therewith. The chalk line is operatively connected with the chalk line support and arranged to extend through the cartridge housing opening. The lock arrangement is configured to lock the cartridge assembly to the housing. The lock arrangement is releasable to enable the cartridge assembly to be disconnected from the housing so as to be replaced by a new cartridge assembly. The retractor is operable to retract the chalk line into the cartridge housing and allow the chalk line to be extended from the cartridge housing through the cartridge housing opening.

Another aspect of the present patent application provides a chalk line device. The chalk line device includes a housing, a reel mounted for rotation within the housing, a liquid container disposed within the housing, and a handle connected with the reel and extending outside the housing. The reel is constructed and arranged to carry a chalk line wound thereon. The liquid container has a sealed configuration and an unsealed configuration, wherein in the unsealed configuration the liquid container is configured to receive liquid chalk therein, and in the sealed configuration the liquid container substantially seals the liquid chalk received therein. The reel is positioned in the liquid container such that the chalk line wound therein is at least partially submerged in the liquid chalk received in the liquid container. The handle is operable to wind up the chalk line onto the reel.

Another aspect of the present patent application provides a chalk line device. The chalk line device includes a housing, a chalk line, a reel mounted for rotation within the housing, liquid chalk, a liquid container disposed within the housing, and a handle connected with the reel and extending outside the housing. The reel is constructed and arranged to carry the chalk line wound thereon. The liquid container has a sealed configuration and an unsealed configuration, wherein in the unsealed configuration the liquid container is configured to receive the liquid chalk therein, and in the sealed configuration the liquid container substantially seals the liquid chalk received therein. The reel is positioned in the liquid container such that the chalk line wound therein is at least partially submerged in the liquid chalk received in the liquid container. The handle is operable to wind up the chalk line onto the reel.

Another aspect of the present patent application provides a liquid chalk composition. The liquid chalk composition includes water or alcohol comprising 60% to 95% by volume, powdered chalk particles comprising 5% to 40% by volume, wherein 90% of powdered chalk particles range in their maximum dimension from 10 microns to 200 microns, and a stabilizing agent comprising 4% to 25% by volume.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION

Figure 1:
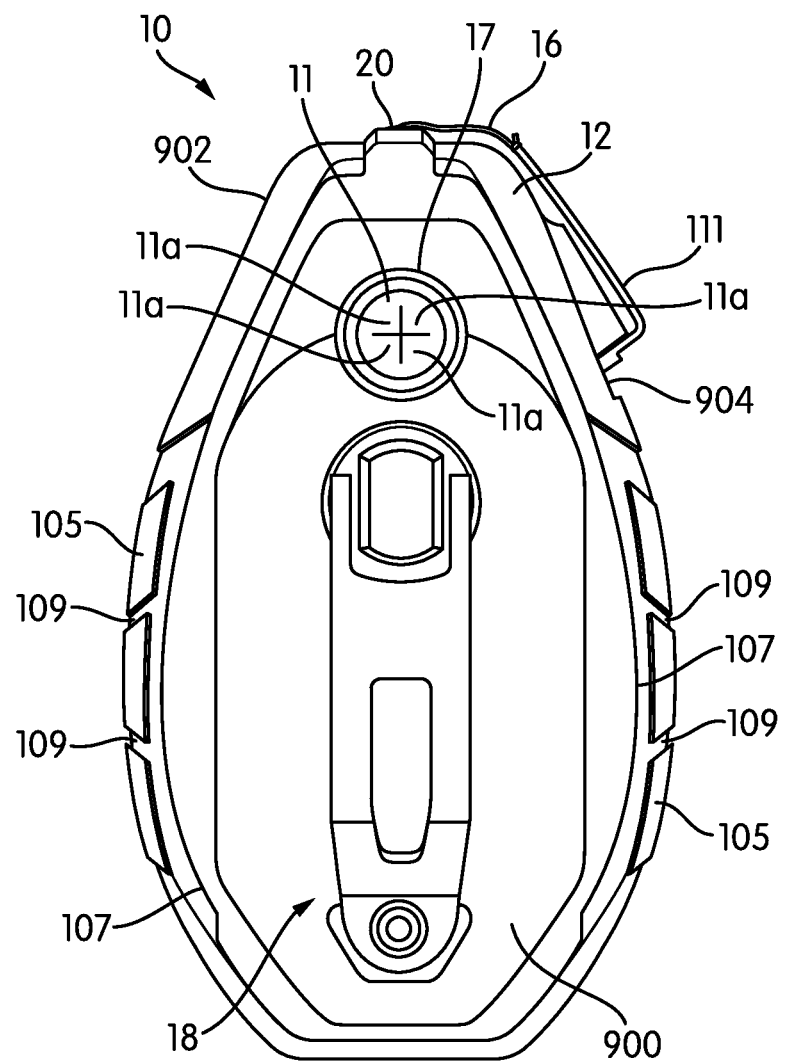
FIG. 1 shows a rear elevational view of a chalk line device in accordance with an embodiment of the present patent application.
Figure 2:
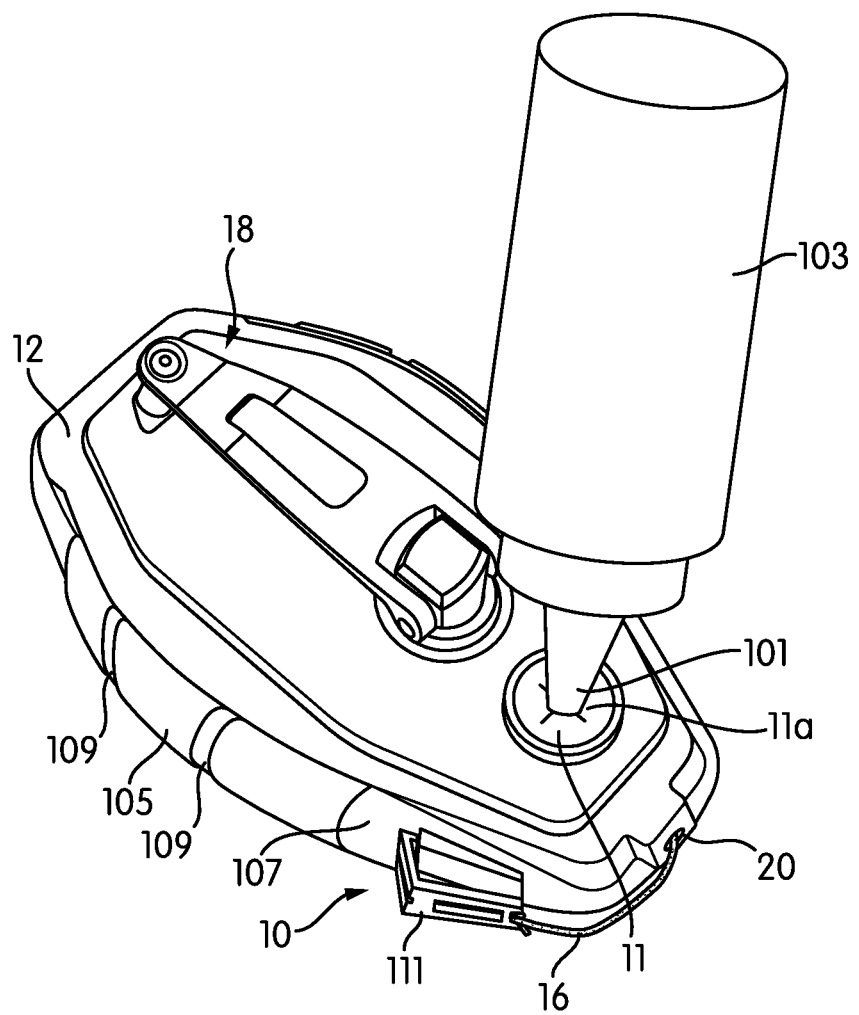
FIG. 2 shows a perspective view of the chalk line device in which a valve of the chalk line device is configured to seal with a nozzle of a chalk bottle for providing chalk to a chalk receptacle of the chalk line device in accordance with an embodiment of the present patent application.
Figure 3:
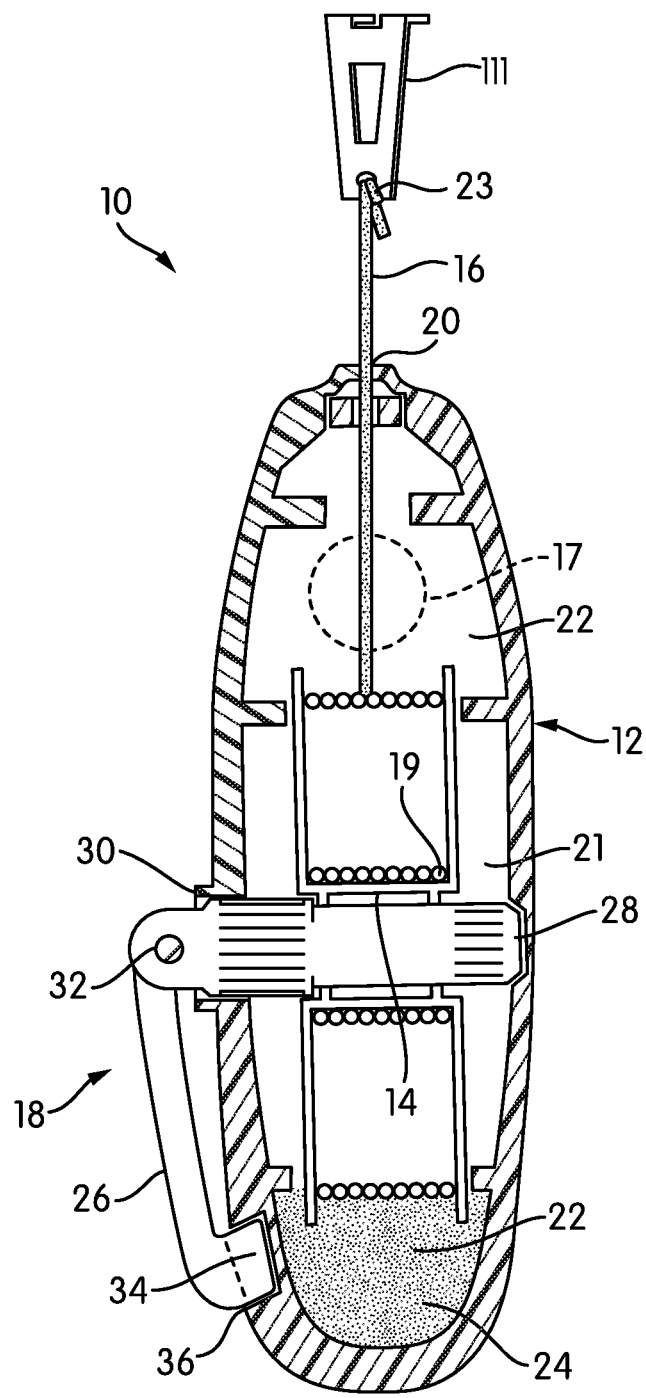
FIG. 3 shows a partial cross-sectional view of a retractor of the chalk line device in accordance with an embodiment of the present patent application.
Figure 4:
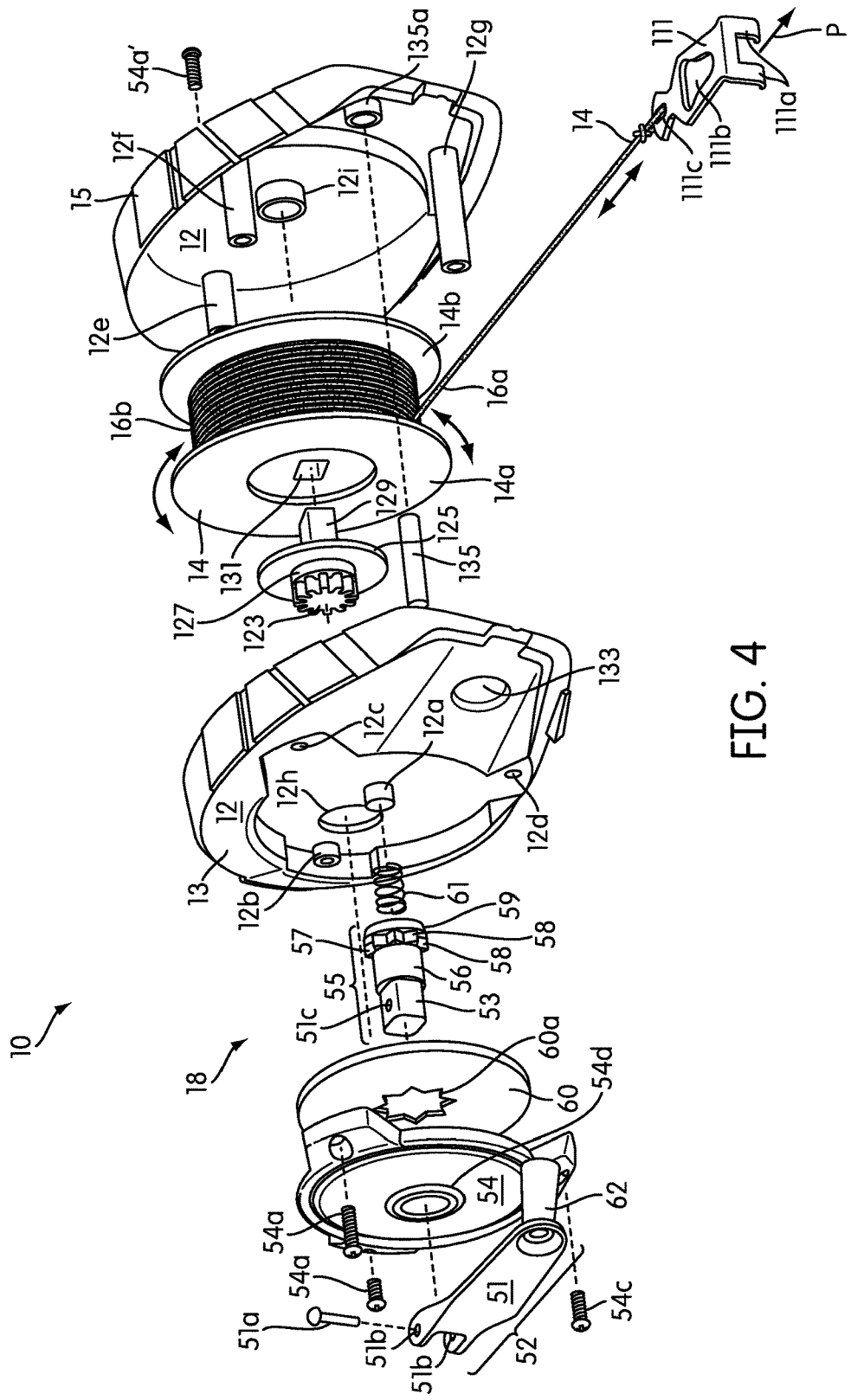
FIG. 4 shows an exploded view of the chalk line device in accordance with another embodiment of the present patent application.

FIGS. 1-5 show a chalk line device 10 that includes a housing 12, a chalk line support 14 (as shown in FIGS. 3 and 4) mounted in the housing 10, a chalk line 16, a retractor 18 (as shown in FIGS. 3 and 4), and a valve 11. The housing 10 has a chalk line opening 20, a chalk receptacle 17 and a chalk reservoir 22 into which chalk 24 can be stored when received from the chalk receptacle 17. The chalk line 16 is operatively connected with the chalk line support 14 and is arranged to extend through the chalk line opening 20. The retractor 18 is mounted to the housing 12 and is operable to retract the chalk line 16 into the housing 12 and allow the chalk line 16 to be extended from the housing 12 through the chalk line opening 20. The valve 11 is operatively associated with the chalk receptacle 17. The valve 11 is movable between a first position (as shown in FIG. 1) in which the valve 11 is configured to substantially seal the chalk receptacle 17 and a second position (as shown in FIG. 2) in which the valve 11 is configured to be open to enable the chalk 24 to be introduced to the chalk reservoir 22 through the chalk receptacle 17. The valve 11 has sealing surfaces 11a configured to seal with a nozzle 101 of a chalk bottle 103 for providing chalk 24 to the chalk receptacle 17.

In one embodiment, the housing 12 may be formed of a plastic material or a composite material. In another embodiment, the housing 12 may be formed of a metal material, a hybrid material or any other suitable material or combination of materials. In one embodiment, the housing 12 may include an overmolded covering 105 made, for example, of an elastomeric material, on a side exterior surface 107 to facilitate easy gripping by a user. The overmolded covering 105 may also optionally include one or more grip formations 109 (e.g., undulations, ridges, grooves or other textured formations) for providing enhanced grip. These grip formations 109 provide the user with a less slippery surface to grip and handle the chalk line device 10.

In one embodiment, the housing 12 defines an interior space 21. The interior space 21 includes the chalk reservoir 22 in communication with the chalk port or receptacle 17. In one embodiment, the chalk reservoir 22 is operatively disposed between the chalk line support 14 and the chalk line opening 20 in the housing 12. The chalk line 16 is configured to pass through the chalk reservoir 22 before passing through the chalk line opening 20. In one embodiment, the interior space 21 also includes the chalk line support 14 and the chalk line 16 is operatively connected to the chalk line support 14.

In one embodiment, the housing 12 includes a translucent window that allows the user to check the level of the chalk material remaining in the chalk reservoir 22. In various embodiments, the structure of the translucent window can be of the type described in commonly assigned U.S. Patent Application Publication No. 2008/0236442 that is hereby incorporated by reference in its entirety. In one embodiment, the translucent window may also allow the user to check the color of the chalk material stored in the chalk reservoir 22.

The valve 11 is movable between a first position (as shown in FIG. 1) in which the valve 11 is configured to substantially seal the chalk receptacle 17 and a second position (as shown in FIG. 2) in which the valve 11 is configured to be open to enable the chalk 24 to be introduced to the chalk reservoir 22 through the chalk receptacle 17. In one embodiment, the valve 11 is configured to be open when a nozzle 101 of the chalk bottle 103 is inserted in the chalk receptacle 17 and the valve 11 is configured to substantially seal the chalk receptacle 17 when the nozzle 101 of the chalk bottle 103 is removed from the chalk receptacle 17.

In one embodiment, the valve arrangement 11 is configured to provide a sealed inlet or interface between the chalk bottle 103 and the chalk housing 12 so as to prevent the chalk 24 from spilling outside the chalk housing 12 during the chalk fill or refill procedure (i.e., when the chalk 24 is being filled into the reservoir 22 of the housing 12). In one embodiment, the seal is a flexible seal. In one embodiment, with the valve arrangement 11, there will be less loose chalk debris and chalk spillage when filling the chalk reservoir 22 of the chalk reel housing 12.

The valve 11 has sealing surfaces 11a configured to seal with the nozzle 101 of the chalk bottle 103 for providing chalk 24 to the chalk receptacle 17. The valve 11 is configured to move from the first position to the second position when the nozzle 101 of the chalk bottle 103 is pressed against the sealing surfaces 11a of the valve 11. The resilient sealing surfaces 11a are constructed and arranged to rest on side surfaces of the nozzle 101 of the chalk bottle 103, when the chalk bottle 103 is providing the chalk 24 to the chalk receptacle 17, so as to form the sealed interface between the chalk dispensing bottle 103 and the housing 12 and to prevent leakage of the chalk 24 at the sealed interface during a chalk fill or refill procedure.

In one embodiment, the valve 11 and the sealing surfaces 11a are made of an elastomeric material, a rubber material, a resilient material, a flexible material, or a deformable material. In one embodiment, the sealing surfaces 11a of the valve 11 may create tight seal region(s) between the nozzle 101 of the chalk dispensing bottle 103 and the housing 12 when the nozzle 101 of the chalk dispensing bottle 103 is received by the chalk receptacle 17. In one embodiment, the tight seal region(s) may be created by the force of the chalk dispensing bottle 103 pressing down on the sealing surfaces 11a of the valve 11. In one embodiment, the material of the sealing surface 11a enables the sealing surfaces 11a to seal with the nozzle 101 of the chalk dispensing bottle 103 when the nozzle 101 of the chalk dispensing bottle 103 is received by the chalk receptacle 17 so as to prevent leakage of the chalk 24 at the interface between the chalk dispensing bottle 103 and the housing 12.

In one embodiment, the nozzle 101 of the chalk dispensing bottle 103 may include a frusto-conical shaped configuration. In one embodiment, the sealing surfaces 11a are pushed aside by the surfaces of the frusto-conical shaped nozzle.

In one embodiment, as illustrated in FIG. 1, the valve 11 may include one or more diametrical slit(s) disposed centrally on the valve 11. In one embodiment, the valve 11 may include a cross shaped diametrical slits (e.g., shaped like a + symbol) disposed centrally on the valve 11. In one embodiment, the sealing surfaces 11a of the valve 11 are configured to separate at the slit(s) to enable the nozzle 101 of the chalk bottle 103 to be received in the chalk receptacle 17. In one embodiment, forces of the material of the sealing surfaces 11a are configured to bias the sealing surfaces 11a into a closed sealing contact arrangement with each other, at the slits(s), when the nozzle 101 of the chalk bottle 103 is withdrawn in the chalk receptacle 17.

In one embodiment, the valve 11 may be a one-way valve arrangement configured to allow the chalk 24 to be provided to the chalk receptacle 17 and to prevent the chalk 24 in the chalk reservoir 22 from escaping from the chalk housing 12.

In one embodiment, the valve 11 and the chalk receptacle 17 are disposed on a rear wall 900 of the housing 12. In another embodiment, the valve 11 and the chalk receptacle 17 may be disposed on a side wall 902 of the housing 12 or may be disposed on a front wall that is opposite to the rear wall 900 of the housing 12.

When the chalk material 24 in the chalk line device 10 runs out, the chalk line device 10 may be filled with additional chalk material from the chalk dispensing bottle 103. For example, the additional chalk material may be introduced into the chalk reservoir 22 through the chalk receptacle 17.

When the nozzle 101 of the chalk bottle 103 is pressed against the sealing surfaces 11a of the valve 11, the valve 11 is configured to move from the first position to the second position. When the nozzle 101 of the chalk bottle 103 is being inserted in the chalk receptacle 17 and being pressed against the sealing surfaces 11a of the valve 11, the sealing surfaces 11a of the valve 11 are configured to separate, at the slit(s), to enable the nozzle 101 of the chalk bottle 103 to be received by the chalk receptacle 17. The weight/force of the chalk dispensing bottle 103 pressing down on the sealing surfaces 11a of the valve 11, the forces of the material of the sealing surfaces 11a of the valve 11, or both are configured to create tight seal region(s) between the nozzle 101 of the chalk dispensing bottle 103 and the housing 12 (i.e., when the nozzle 101 is received by the chalk receptacle 17). The sealing region(s) between the nozzle 101 of the chalk dispensing bottle 103 and the housing 12 prevent leakage of the chalk 24 at the interface between the chalk dispensing bottle 103 and the housing 12 during the chalk material refilling procedure.

After the chalk material refilling procedure is complete, the nozzle 101 of the chalk dispensing bottle 103 is simply withdrawn from the chalk receptacle 17. The valve 11 is configured to substantially seal the chalk receptacle 17 when the nozzle 101 of the chalk bottle 103 is removed from the chalk receptacle 17. In one embodiment, forces of the material of the sealing surfaces 11a are configured to bias the sealing surfaces 11a into a closed sealing contact arrangement with each other, at the slits(s), when the nozzle 101 of the chalk bottle 103 is withdrawn in the chalk receptacle 17.

Referring to FIG. 3, the retractor 18 of the chalk line device 10 may be a direct drive mechanism and may include a handle 26, a crank shaft 28 and an integral hub 30. The retractor 18 is connected to the chalk line support 14 via the crank shaft 28 and allows the chalk line 16 to be freely extended from the housing 12 through the chalk line opening 20 when the user pulls a chalk line hook 111 attached to a free end 23 of chalk line 16. The retractor 18 also allows selective retraction of the chalk line 16 into the housing 12 when the user rewinds the chalk line 16 by rotating the handle 26. Of course any known retracting and spooling mechanisms could be used.

The handle 26 of the retractor 18 may be connected to its integral hub 30 via a pivot pin 32. The handle 26 may easily be moved from a storing position through an arc of about 180 degrees to assume a cranking position as is known. The handle 26 may have an end knob 34 rotatably mounted on the handle 26 to allow the user to rotate the handle 26 while being able to maintain grip on the knob 34. This feature facilitates rewinding of the chalk line 16. In addition, the knob 34 also serves as a rotating-stop for halting the rotation of the integral hub 30 and the crank shaft 28 when the handle 26 is moved to a stored position. In the stored position, the end knob 34 is inserted into a groove 36 provided in the exterior surface of housing 12. In this way, the groove 36 serves as a rotating-stop and also renders the handle 26 more compact with the housing 12 for storage and/or handling.

In one embodiment, the retractor 18 is configured to drive the chalk line support 14 to retract the chalk line 16 into the housing 12 through the chalk reservoir 22 such that the chalk line 16 is wound around the chalk line support 14. In one embodiment, the retractor 18 is configured to drive the chalk line support 14 to extend the chalk line 16 from the housing 12 through the chalk reservoir 22 so as to cause the chalk line 16 to be coated with the chalk 24 disposed in the chalk reservoir 22.

Referring to FIG. 4, the retractor 18 of the chalk line device 10 may include a gear arrangement or mechanism. FIG. 4 is an exploded view of the chalk line device 10 showing internal and external structural arrangement details thereof, in accordance with an embodiment of this disclosure.

Starting from the left in FIG. 4, an elongated part 51 of a reel winder 52 includes a pair of holes 51b to accommodate a fastener 51a. The fastener 51a also goes through a hole 51c on a mounting hub 53 causing the mounting hub 53 to be attached securely to the elongated part 51 of the reel winder 52. Housing cap 54 includes a hole 54d that accommodates pivot structure 55 (which includes a cylindrical portion 56 attached to the mounting hub 53). In one embodiment, an additional housing cap may be disposed on a side of housing 12 opposite to a side where the reel winder 52 is arranged on the housing cap 54. The additional cap is optional and is arranged to enhance structural strength of chalk line device housing 12.

Figure 5:
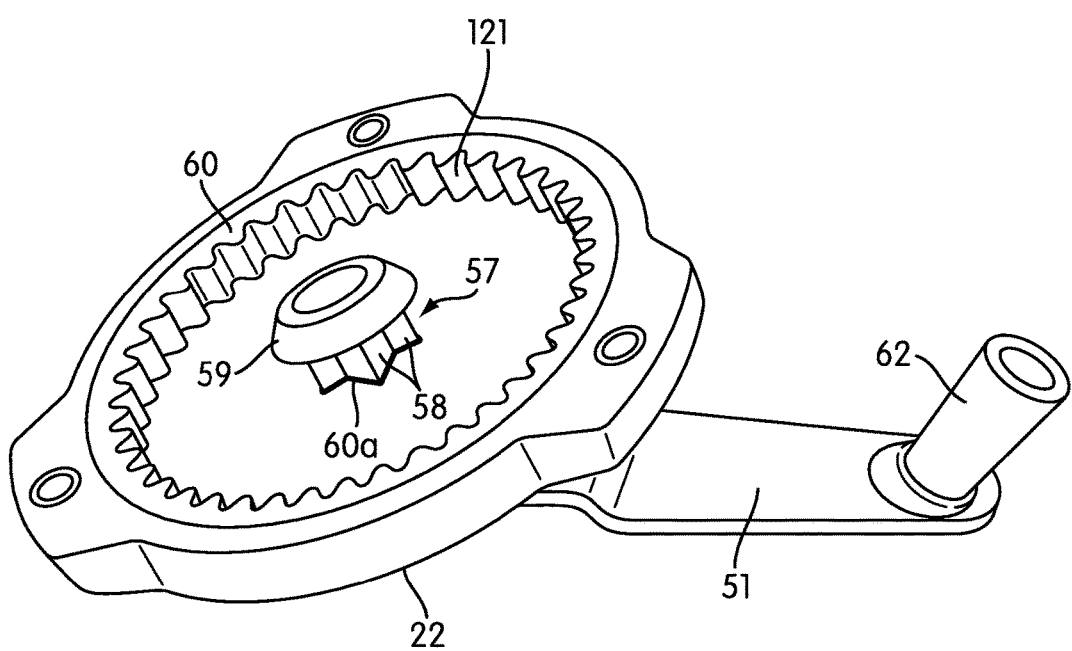
FIG. 5 shows an inner view of a gear member arrangement of the chalk line device of FIG. 4 that rotatably attaches to a reel winder in accordance with an embodiment of the present patent application.

The pivot structure 55 also includes a gear member 57 with teeth 58 and a circular portion 59. The gear member 57 is received into a similarly shaped hole 60a on an inner ring gear 60 rotatably received within the housing cap 54, as illustrated in FIG. 5. Also shown are plurality of screws 54a-54c that fit into their respective grooves as shown by the corresponding dotted lines parallel to respective major axes of the screws. In this embodiment, the screws 54a-54c extend through their respective grooves, via respective receptacles 12c, 12b, and 12d, into three cylindrical fastener receiving protrusions 12e, 12f, and 12g on the interior surface of a housing half 15 to hold housing halves 13 and 15 of housing 12 together.

The circular portion 59 has a receptacle or stud that receives one end of a spring 61, the spring 61 having a second end that fits into or on a receptacle 12a formed on the housing half 13. In one embodiment, the receptacle 12a is a stud that extends into the coils of the spring 61, although in alternative aspects, the receptacle 12a may be a groove or a recess that receives the spring 61. The receptacle 12a may be configured to secure the spring 61 such that when the end of the mounting hub 53 is manually pushed inwards, the mounting hub 53 compresses the spring 61.

The receptacle 12a also serves as an axle for rotation of the pivot structure 55. The rotation of the pivot structure 55 (by manual rotation of a handle 62 of the reel winder 52) causes rotation of the teeth 58, which engages with correspondingly shaped hole 60a in the inner ring gear 60, to rotate the inner ring gear 60, as will be appreciated by also looking at FIG. 5 described below. The spring 61 is biased to normally retain the teeth 58 at an axial position in which it is aligned to engage with the hole 60a. However, the pivot structure 55 can be manually pushed inwards by manually pushing in on the end of the mounting hub 53 against the bias of the spring 61. This axial movement of the pivot structure 55 moves the teeth 58 out of engagement with the correspondingly shaped hole 60a. As a result, in this position, rotation of the inner ring gear 60 will not cause rotation of the pivot structure 55 or the reel winder 52. This may be desirable when the chalk line 16 is manually pulled out of the housing 12, to extend the line, so that rotation of the chalk like support 16 during this action does not cause rotation of the reel winder 52.

FIG. 5 shows the inner ring gear 60 with teeth 121 in more detail when looking at a side of the inner ring gear 60 facing a hole 12h in the housing half 13. As best seen in FIG. 5, through the hole 12h on the housing half 13, the teeth 123 of a gear structure 125 fit through to mesh with the teeth 121 of the inner ring gear 60. When the reel winder 52 is rotated, a rotational motion is transferred via the pivot structure 55 to the inner ring gear 60. In one embodiment, during the rotation of the inner ring gear 60, the teeth 121 of the inner ring gear 60 mesh with the teeth 123 of the gear structure 125 and thus rotate the gear structure 125.

Referring back to FIG. 4, the gear structure 125 also has a disc-shaped portion 127 having an axial extension 129 that fits into a correspondingly shaped hole 131 of the rotatable reel 14. The rotation of the gear structure 125 thus in turn transfers its rotational motion to the rotatable reel 14 via the axial extension 129 fitted into the hole 131.

In one embodiment, as shown in FIG. 4, the rotatable chalk line support/reel 14 is shaped to have two extended discs 14a and 14b connected to one another by a central hub (hidden from view in FIG. 4 by a portion 16b of the elongated chalk line 16 that is wound on the central hub by discs 14a, 14b). The elongated chalk line 16 is extended at portion 16a tangentially from the central hub. Upon application of a pulling force P on the chalk line hook 111 by a user, the portion 16a straightens out and applies a rotation force to the central hub of the chalk line support 14. The central hub of the chalk line support 14 can thus be rotated when the chalk line 16 is pulled.

In one embodiment, a support member 135 extends between and is connected to the housing halves 13 and 15. The ends of the support member 135 fit into a pair of recesses or grooves 135a inside the housing 12, in the respective the housing halves 13, 15 (only one of the pair of grooves 135a being shown in FIG. 4). The support member 135 may be formed of a metal or other rigid material.

Recess 133 shown on the housing 12 accommodates the distal end of the handle 62 when the reel winder 52 is not in use, or when the chalk line device 10 is not in use. The housing half 15 includes cylindrical fastener receiving protrusions 12e, 12f, and 12g that support housing halves 13 and 15 by receiving screws 54a-54c, respectively. The fastener receiving protrusions 12e, 12f, and 12g may be configured to receive additional screws (e.g., screw 54a') to provide additional support for securing housing halves 13 and 15 together. Additionally, a cylindrical hollow protrusion 12i formed on the interior surface of the housing half 15 supports positioning of and smooth rotation of the rotatable chalk line support 14 thereabout. In one embodiment, the chalk line support 14 has a cooperative projection or recess that acts as an axle that rotatably engages with the protrusion 12i.

Figure 5A:
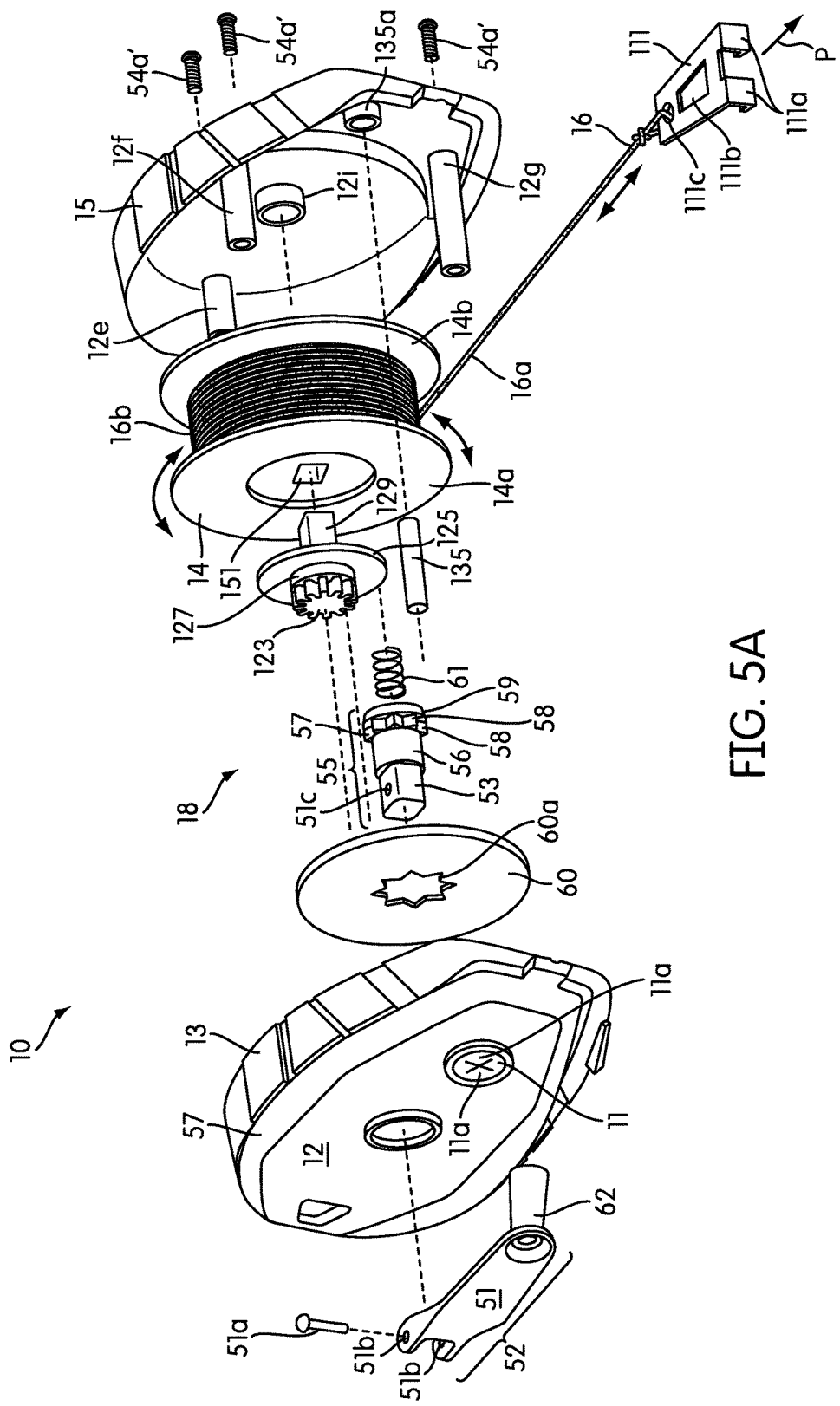
FIG. 5a shows another exploded view of the chalk line device in accordance with another embodiment of the present patent application.

FIG. 5a shows another exploded view of the chalk line device 10 in accordance with another embodiment of the present patent application. The retractor 18 of the chalk line device 10, in FIG. 5a, also has a gear arrangement or mechanism. The operation of the retractor 18 shown in FIG. 5a is similar to the operation of the retractor 18 shown and described with respect to FIG. 4. The structure of the retractor 18 shown in FIG. 5a is similar to the structure of the retractor 18 shown and described with respect to FIG. 4, except for the following differences. The inner ring gear 60, the spring 61 and the pivot structure 55 are disposed inside the housing 12. Also, the chalk line device 10 of FIG. 5a does not include housing cap 54.

The chalk line support 14 is rotatably mounted in the interior space 21 in the housing 12. In one embodiment, the chalk line support 14 may be shaped to have two extended discs connected to one another by a central hub, for example, as shown in FIG. 4. In one embodiment, the chalk line support 14 may be an integrally formed structure. In one embodiment, the chalk line 16 may extend along a straight line tangentially from the central hub or the chalk line support 14 toward the chalk line opening 20. Upon application of a pulling force on the chalk line hook 111 by a user, portions of the chalk line 16 straighten out and apply a rotation force to the chalk line support 14 (or its central hub). The chalk line support 14 (or its central hub) may thus be rotated when the chalk line 16 is pulled. In one embodiment, the chalk line support 14 may be formed of a plastic material or a composite material. In another embodiment, the chalk line support 14 may be formed of a metal material, a hybrid material or any other suitable material or combination of materials.

The chalk line 16 is made of a material that facilitates the adherence of the chalk material 24 thereto for marking a surface. As shown in FIG. 3, the chalk line 16 has one end 19 secured to the chalk line support 14 within the housing 12 and another end (or free end) 23 provided with the chalk line hook 111 disposed outside of the housing 12. The chalk line 16 is spooled around the chalk line support or reel 14. The chalk line 16 may be wound on chalk line support or reel 14 when the handle of the retractor 18 is operated by a user. It is to be noted that although the chalk line 16 is moved in and out of housing 12 using the handle of the retractor 18, in other embodiments, the chalk line 16 may be moved into the housing 12 using a one-way spring loaded winding mechanism that pulls the chalk line 16 into the housing 12. The chalk line 16 may be pulled out of housing 12 by a user pulling, for example, on the chalk line hook 111 attached to the free end 23 of the chalk line 16 (e.g., attached at a distal end 23 of the chalk line 16). This may be facilitated by the user pushing in on the spring biased hub portion. In yet another embodiment, the chalk line 16 may be wound or unwound using a small battery operated motor attached to and/or inside housing 12.

In one embodiment, referring to FIG. 4, the chalk line hook 111 may include a through-hole 111c for fastening the elongated chalk line 16, and another hole 111b for hanging chalk line device 10, for example, on a nail in a wall for storage. Alternatively, hole 111b may also be used to fix the elongated chalk line 16 to a projecting member or a workpiece where more suitable than claws 111a. The hole 111b may also be used to attach the chalk line hook 111 to housing 12 over a protrusion disposed on an exterior surface of the housing 12, when the chalk line device 10 is not in use.

In one embodiment, the chalk line hook 111 may be made of a metal material or a plastic material. In another embodiment, the chalk line hook 111 may be made of composite or hybrid materials as would be appreciated by one skilled in the art. In various embodiments, the structure of the chalk line hook 111 can be of the type described in commonly assigned U.S. Pat. Nos. 6,915,587; 7,913,408; and 8,713,810 that are hereby incorporated by reference in their entirety. Although the chalk line hook 111 is shown in the Figures of these patents having a certain shape or form, it is also within the scope of the present disclosure to have various shapes or form.

In one embodiment, when chalk line device 10 is not in use, the chalk line hook 111 may rest over a protrusion formed on an exterior surface of the housing 12. In various embodiments, the structure of the protrusion can be of the type described in commonly assigned U.S. Pat. No. 8,713,810 that is hereby incorporated by reference in its entirety. In another embodiment, other mechanisms for resting the chalk line hook 111 may be used, for example, a snap-on clip. In yet another embodiment, the exterior surface of housing 12 may include a depression or elongated opening 904 formed therein that is shaped to receive the chalk line hook for storage. In various embodiments, the structure of the depression/elongated opening can be of the type described in commonly assigned U.S. Patent Application Publication No. 2008/0236442 that is hereby incorporated by reference in its entirety. In yet another embodiment, the protrusion, depression, or snap-on clip may be optional and the chalk line hook 111 may simply hang from the chalk line device 10.

The chalk line device 10 further may include a clip that is pivotally attached to the exterior wall or surface of the housing 12. The clip may be spring biased at the point of its attachment (to the housing 12) to allow biasing the clip toward the exterior wall of the housing 12. The clip may be used, for example, to hold the chalk line device 10 on a support. For instance, the clip may be slid in a belt or on a pocket rim of a user to allow easy retrieval and storage. In one embodiment, such a clip may be disposed on the side wall/surface 902 or a front wall, opposite to the rear wall 900, of the housing 12.

Figure 6:
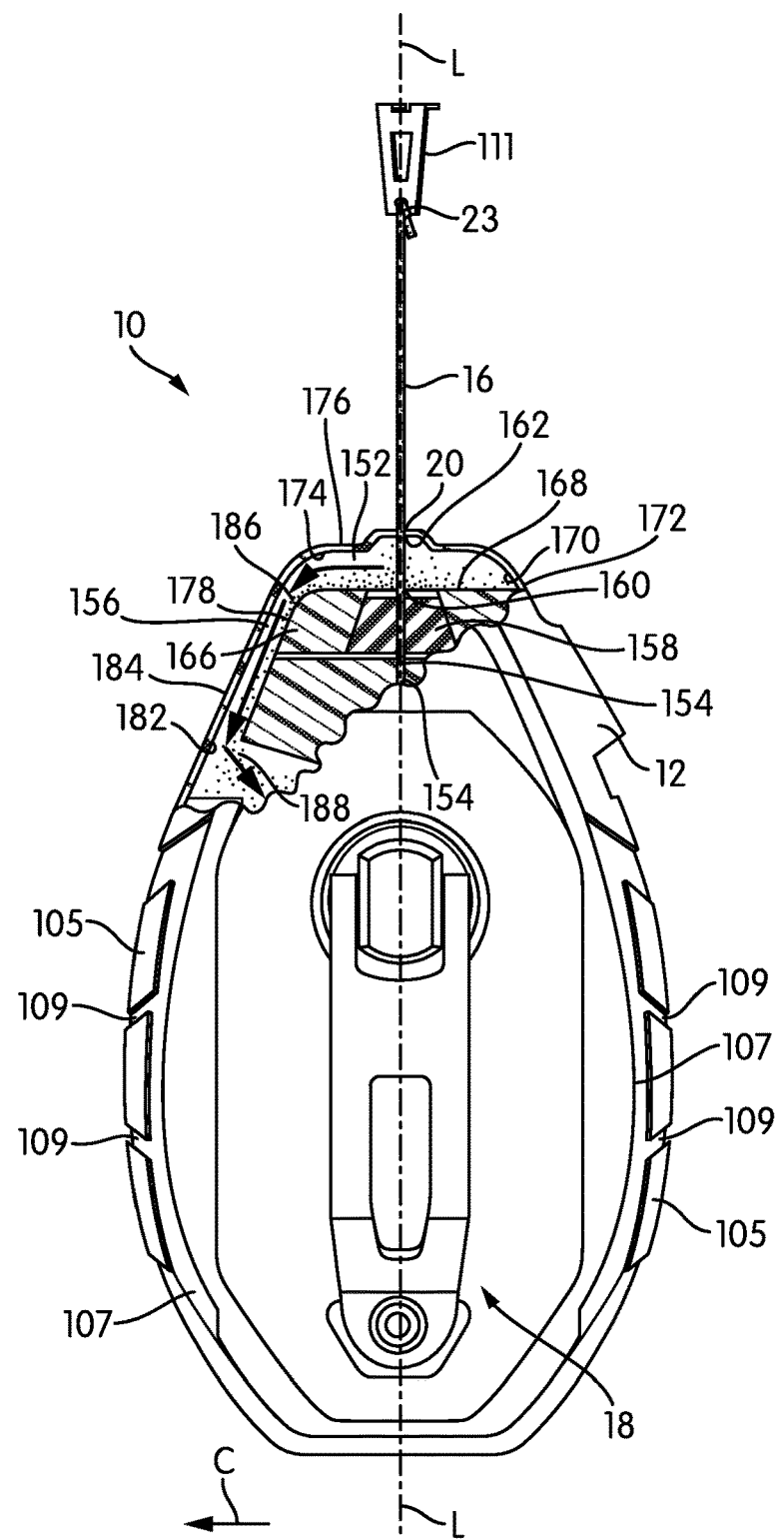
FIG. 6 shows a rear elevational and partial cross-sectional view of the chalk line device in accordance with another embodiment of the present patent application.
Figure 7A:
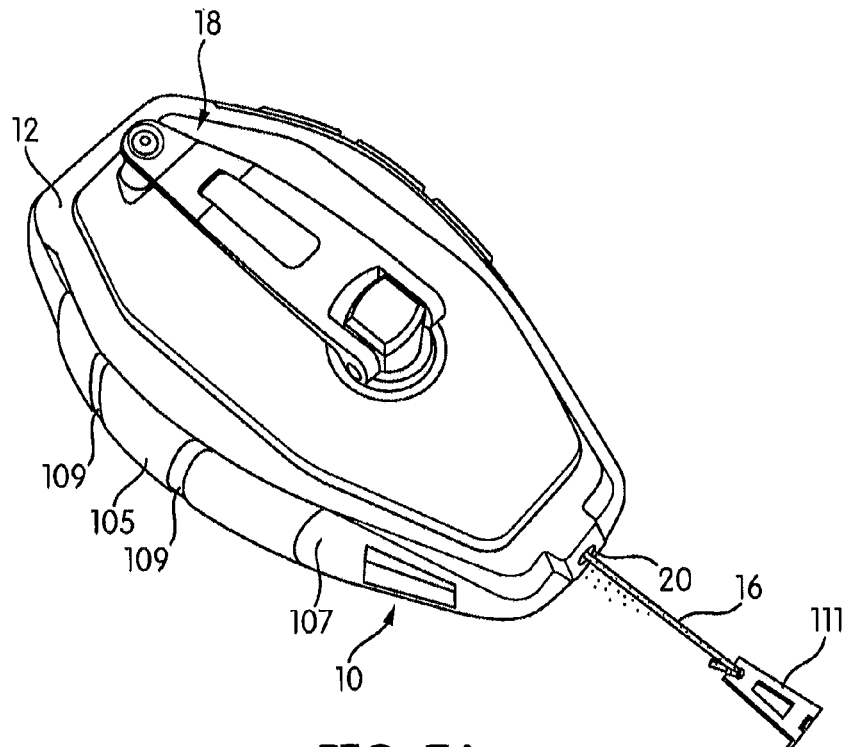
FIGS. 7A and 7B show perspective views of a prior art chalk line device and the chalk line device in accordance with an embodiment of the present patent application.
Figure 7B:
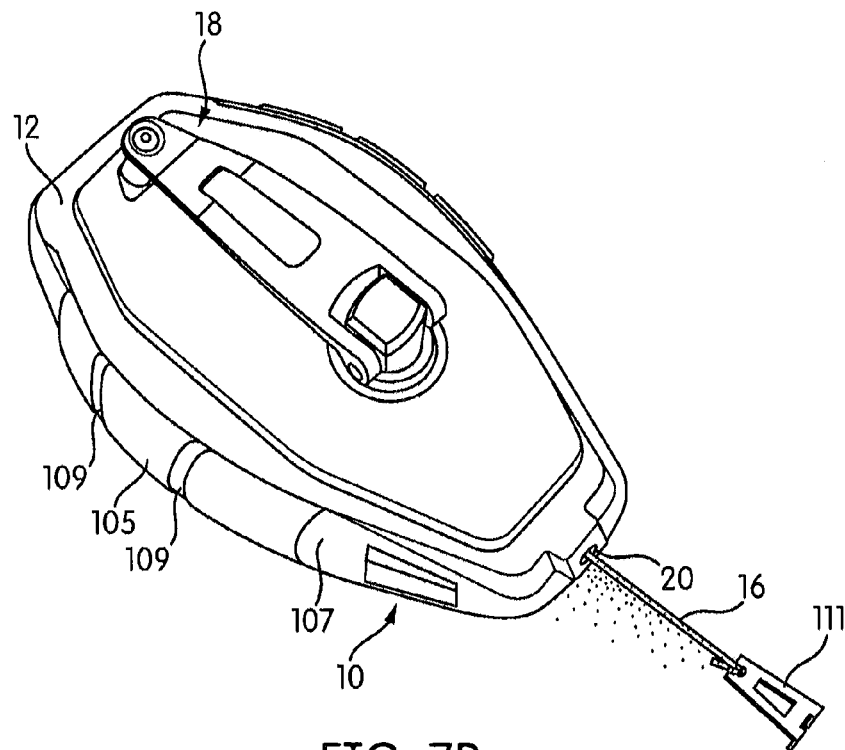

Referring to FIGS. 6, 7A and 7B, in one embodiment, the chalk line device 10 may include a secondary chalk reservoir 152 that is configured to capture excess chalk deposited on the chalk line 16 before the chalk line 16 exits the housing 12 through the chalk line opening 20. In one embodiment, this secondary chalk reservoir design is configured to prevent excess chalk from spilling from the chalk reel housing 12 when the chalk line 16 is extended during use. In one embodiment, the secondary chalk reservoir/chamber 152 is designed into the nose of the chalk reel housing 12 and is configured to catch any loose chalk on the chalk line as the chalk line 16 exits the housing 12 and return the loose chalk to the main chalk reservoir/chamber 22 within the housing 12. In one embodiment, the process of removing excess chalk from the surfaces of the chalk line 16, before the chalk line 16 is extended from the housing 12, is configured to prevent excess chalk from spilling from the chalk housing 12 when the chalk line 16 is extended during use. In one embodiment, there will be less loose chalk debris when the chalk line 16 is extended from the housing 12.

In one embodiment, the secondary chalk reservoir 152 is different, separate and independent from the chalk reservoir 22 in the housing 12 in which chalk 24 can be stored. In one embodiment, the chalk line device 10 includes both the chalk reservoir 22 and the secondary chalk reservoir 152. In another embodiment, the secondary chalk reservoir 152 is optional.

In one embodiment, the secondary chalk reservoir 152 is operatively disposed between the main chalk reservoir 22 and the chalk line opening 20 in the housing 12. The main chalk reservoir 22 has a main chalk reservoir opening 154. The chalk line 16 passes through the main chalk reservoir opening 154 before passing through the chalk line opening 20 when the chalk line 16 is extended from the housing 12. In one embodiment, the housing 12 may include a divider portion 166 that is configured to separate the secondary chalk reservoir 152 from the main chalk reservoir 22. In illustrated embodiment, the divider portion 166 may have a trapezoidal shaped configuration so as to conform to the shape of the nose region of the chalk line device 10. In one embodiment, the divider portion 166 may have one or more openings centrally disposed therein, where the one or more openings are configured to enable the chalk line 16 to pass through the divider portion 166. In one embodiment, a top surface 168 of the divider portion 166, an inner surface portion 170 of a side wall 172 of the housing 12, and an inner or lower surface 174 of a top wall 176 of the housing 12 together define/form the secondary chalk reservoir 152.

In one embodiment, the housing 12 is constructed and arranged such that the excess chalk captured in the secondary chalk reservoir 152 is directed back to the main chalk reservoir 22. For example, in one embodiment, the chalk line device 10 may include a return passage 156 between the secondary chalk reservoir 152 and the main chalk reservoir 22 to return captured chalk in the secondary chalk reservoir 152 to the main chalk reservoir 22. In one embodiment, a side surface 178 of the divider portion 166 and an inner surface portion 182 of a side wall 184 of the housing 12 together define the return passage 156. In one embodiment, the return passage 156 may include an inlet opening 186 that is operatively associated with the secondary chalk reservoir 152 and an outlet opening 188 that is operatively associated with the main chalk reservoir 22.

In one embodiment, the chalk line device 10 may include one or more wiper member(s) 158 constructed and arranged to remove excess chalk from the chalk line 16 before the chalk line 16 is extended from the housing 12 through the chalk line opening 20. In one embodiment, the wiper member 158 is configured to slightly engage with the chalk line 16 when the chalk line 16 is extended out of the housing 12 so as to remove excess chalk from the surfaces of the chalk line 16 when the chalk line 16 is being extended out of the housing 12.

In one embodiment, the wiper member 158 may include a trapezoidal shaped configuration. In another embodiment, the wiper member 158 may include a rectangular shaped configuration, a square shaped configuration, a polygonal shaped configuration, or any other shaped configuration as would be appreciated by one skilled in the art. In one embodiment, the wiper member 158 may be connected to the housing 12 by any attachment mechanism as would be appreciated by one skilled in the art. In one embodiment, the attachment mechanism includes, but not limited to, fastening, friction fitting, snap fitting, or adhesive bonding. In one embodiment, the wiper member 158 may be received in the divider portion 166 of the housing 12.

In one embodiment, the wiper member 158 may include a backing or support member and a wiper element disposed thereon, where the wiper element is configured to engage the chalk line 16 for rubbing excess chalk from the chalk line 16. In one embodiment, the backing member may be resilient and is configured to enable the wiper element disposed thereon to slightly engage the chalk line 16, when the chalk line 16 is being extended, so as to remove excess chalk deposited in the chalk line 16. In one embodiment, the wiper element may include a felt material, a fabric material, a cloth material, a material made from compressed animal or synthetic fibers, or any other abrasive granular material as would be appreciated by one skilled in the art. In one embodiment, the backing or support member of the wiper member 158 may be optional and the wiper member 158 may include a trapezoidal shaped or other shaped configuration wiper element that may be made from a material that is configured to effect cleaning of excess chalk from the chalk line 16 while still leaving chalk material (for marking lines) deposited on the chalk line 16.

In one embodiment, the wiper member 158 may include a wiper opening 164 through which the chalk line 16 is extended. In one embodiment, the wiper element, on the support member, is disposed circumferentially around the wiper opening 164. In one embodiment, the diameter of the wiper opening 164 is slightly larger than the diameter of the chalk line 16 extending therethrough such that the wiper element 158 allows the chalk line 16 with chalk deposited thereon to extend through the wiper opening 164 and removes only excess chalk on the chalk line 16 while still leaving chalk material (for marking lines) deposited on the chalk line 16.

In one embodiment, the wiper member 158 is disposed near an entrance 160 of the secondary chalk reservoir 152. In one embodiment, the wiper member 158 is disposed at an exit 162 of the secondary chalk reservoir 152. In one embodiment, the wiper member 158 disposed at the exit 162 of the secondary chalk reservoir 152 is optional. In one embodiment, two wiper members may be disposed at the entrance 160 of the secondary chalk reservoir 152 and the exit 162 of the secondary chalk reservoir 152.

When the user pulls the chalk line hook 111 attached to the free end 23 of the chalk line 16, the retractor 18 is configured to allow the chalk line 16 to be freely extended from the housing 12 through the chalk line opening 20. As the chalk line 16 unwinds from the chalk line support 14, it passes through the chalk material 24 stored in the chalk reservoir 22 such that the chalk material 24 is coated on the surfaces of the chalk line 16. Alternatively, the retractor 18 is also configured to drive the chalk line support 14 to extend the chalk line 16 from the housing 12 through the chalk reservoir 22 so as to cause the chalk line 16 to be coated with the chalk 24 disposed in the chalk reservoir 22.

The chalk material deposited chalk line 16 first extends through the main chalk reservoir opening 154 and then through the wiper opening 164 of the wiper member 158. As the chalk line 16 is being extended through the wiper opening 164 of the wiper member 158, the wiper element of the wiper member 158 is configured to remove any excess chalk on the surfaces of the chalk line 16 while still leaving enough chalk material for marking lines deposited on the chalk line 16.

The excess chalk removed from the surfaces of the chalk line 16 is collected in the secondary chalk reservoir 152 before the chalk line 16 is extended from the housing 12 through the chalk line opening 20. The excess chalk captured in the secondary chalk reservoir 152 may then be transferred to the main reservoir 22 via the return passage 156. For example, this procedure may be performed at desired or predetermined time intervals by the user. In one embodiment, the user may tilt or bend the housing 12 in the direction of the arrow C and relative to a longitudinal axis L-L of the housing 12. This causes the excess chalk captured in the secondary chalk reservoir 152 to enter the return passage 156 via the inlet opening 186. The excess chalk then passes through the return passage 156, under the force of gravity, and exits the return passage 156, via the outlet opening 188, to the main chalk reservoir 22.

FIGS. 7A and 7B show a comparison of the prior art chalk line device and the chalk line device of the present patent application, when their chalk lines 16 are extended (during use) from the respective chalk line devices. As can clearly be seen in FIGS. 7A and 7B, there is less loose chalk debris when the chalk line 16 is extended from the housing 12 of the present patent application. By removing the excess chalk from the surfaces of the chalk line 16 before the chalk line 16 is extended from the housing 12, the excess chalk may be returned to the main chalk reservoir 22 rather than the excess chalk being accumulated as loose chalk debris outside the housing 12. Also, the excess chalk may be returned to the main chalk reservoir 22 may be reused later.

Figure 8:
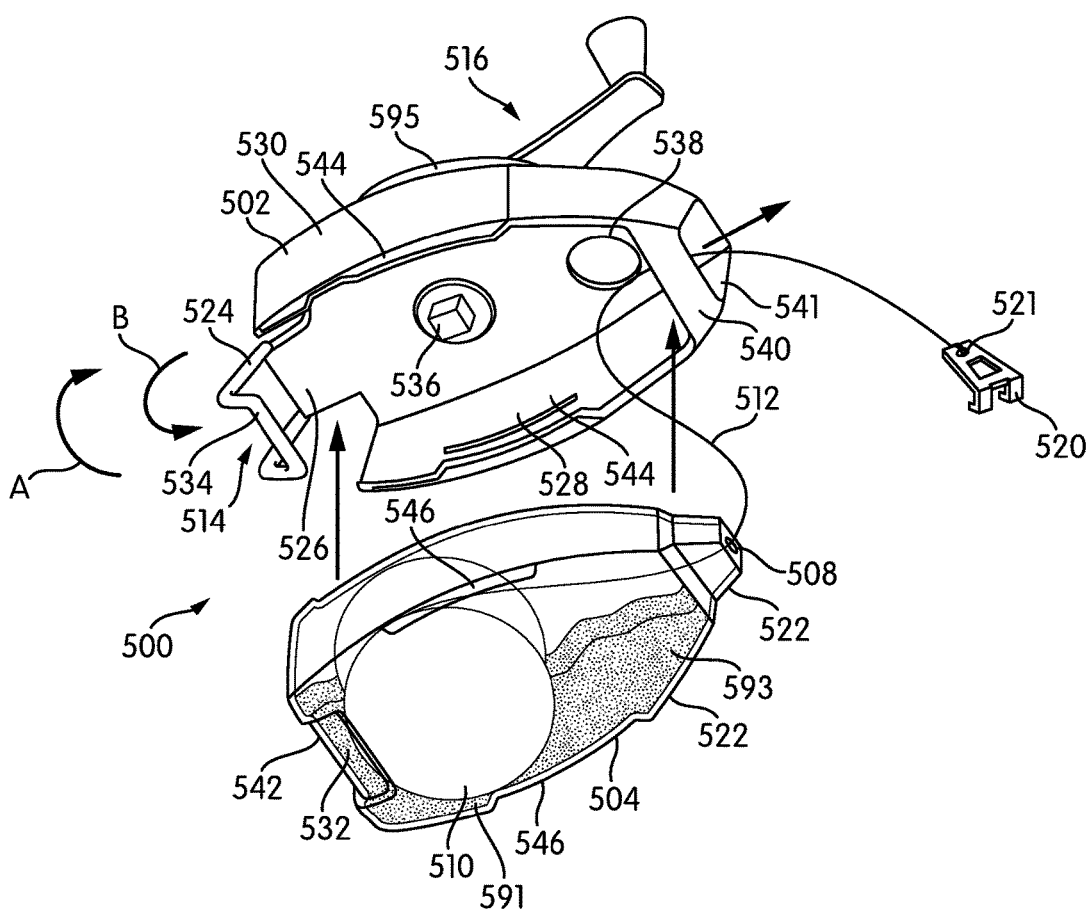
FIG. 8 shows a perspective view of the chalk line device in accordance with another embodiment of the present patent application.
Figure 9:
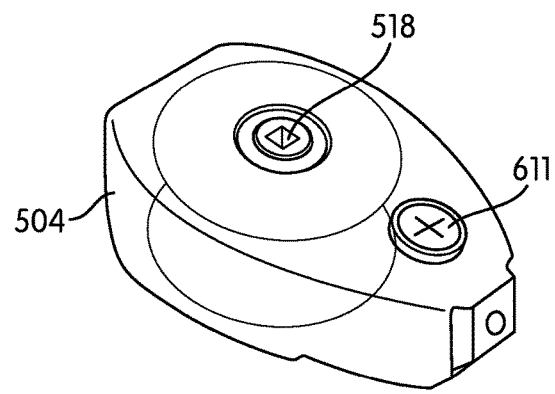
FIG. 9 shows a perspective view of a cartridge assembly of the chalk line device of FIG. 8 in accordance with an embodiment of the present patent application.

FIG. 8 shows a perspective view of a chalk line device 500 and FIG. 9 shows a perspective view of a cartridge assembly 504 of the chalk line device 500 in accordance with another embodiment of the present patent application. Referring to FIGS. 8 and 9, the chalk line device 500 includes a housing 502, the cartridge assembly 504 connectable to the housing 502 and includes a cartridge housing 506 having an opening 508, a chalk line support 510 carried by the cartridge housing 506, a chalk line 512, and a lock arrangement 514. The housing 502 has a retractor 516 operatively connected therewith.

In one embodiment, the housing 502 may a support portion 540 configured to provide support to a front portion 522 of the cartridge housing 506. In one embodiment, the nose of the cartridge housing 506 engages the housing 502 for support. In one embodiment, the housing 502 may include a chalk line opening 541 that is configured to enable passage of the chalk line 512 therethrough. In one embodiment, the housing 502 may include an opening 538 that is configured to enable passage of the nozzle (of the chalk bottle for providing chalk to the chalk receptacle) therethrough. In one embodiment, the chalk line opening 541, the support member 540 and the opening 538 are optional. That is, in one embodiment, the housing 502 may include the retractor 516 and the lock arrangement 514 and may not include the chalk line opening 541, the support member 540 and the opening 538. In one embodiment, the housing 502 may include an overmolded covering and/or one or more grip formations to facilitate easy gripping of the housing 502 by a user.

The cartridge assembly 504 is constructed and arranged to be connectable to the housing 502. In one embodiment, the cartridge assembly 504 includes a hole or opening 518 in the cartridge housing 506 that is configured to receive an axial extension 536 protruding from the retractor 516.

In one embodiment, the cartridge assembly 504 is designed as a sealed unit and is configured to hold the chalk 593 in a chalk reservoir 591 in the cartridge housing 506, the chalk line support 510 and the chalk line 512. The chalk line 512 is operatively connected with the chalk line support 510 and arranged to extend through the cartridge housing opening 508. The chalk line 512, the chalk line support 510, and the cartridge housing opening 508 of the chalk line device 500 have construction and structure similar to the chalk line, the chalk line support, and the chalk line opening described in detail in the above embodiments.

Figure 11:
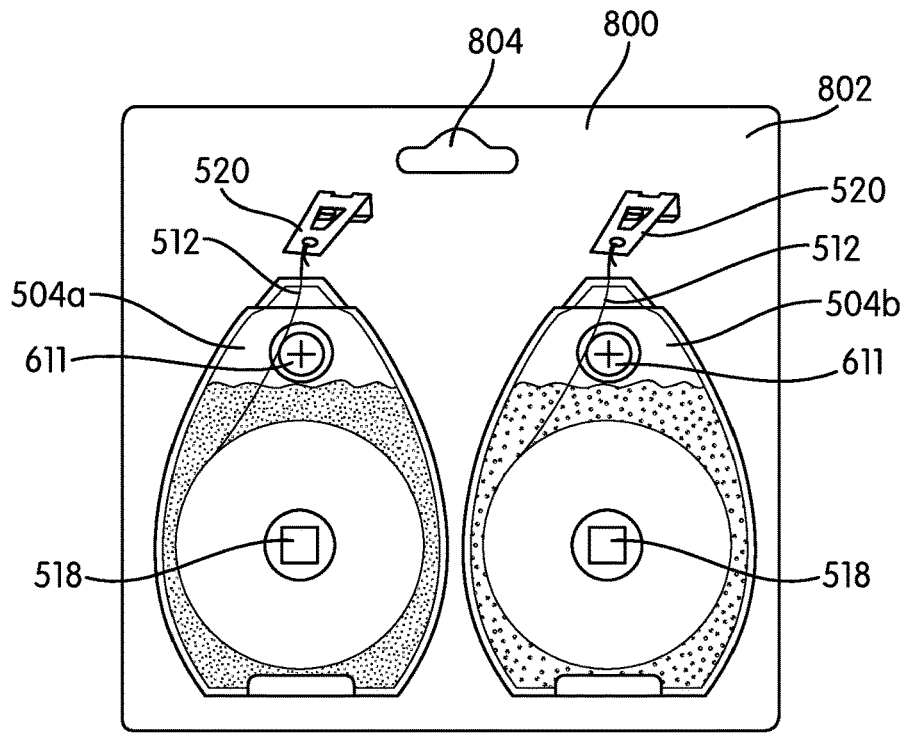
FIG. 11 shows a front elevational view of a refill package of the chalk line device of FIG. 8 in accordance with an embodiment of the present patent application.

In one embodiment, the cartridge assembly 504 is assembled and filled with chalk at the time of manufacture and assembly. In one embodiment, when the cartridge assembly 504 is empty (or out of chalk), the cartridge assembly 504 may be easily removed and be replaced with a new cartridge assembly 504a or 504b (as shown in FIG. 11). In another embodiment, when the chalk color needs to be changed, the cartridge assembly 504 may be easily removed and be replaced with another cartridge assembly having a desired chalk color. Thus, the chalk color may be easily changed and the end-user does not have to carry multiple chalk line devices for different chalk colors.

In one embodiment, the cartridge assembly 504 may include a valve 611, similar to that described in detail with respect to FIGS. 1 and 2, where the valve 611 is configured to seal with a nozzle of a chalk bottle for providing chalk to the chalk receptacle in the cartridge housing 506. In one embodiment, the cartridge assembly 504 may include a secondary chalk reservoir, similar to that described in detail with respect to FIG. 6, which is configured to capture excess chalk deposited on the chalk line 512 before the chalk line 512 is extended from the cartridge housing 506 through the cartridge housing opening 508. In another embodiment, the valve 611 and the secondary chalk reservoir are optional.

The retractor 516 is operable to retract the chalk line 512 into the cartridge housing 506 and allow the chalk line 512 to be extended from the cartridge housing 506 through the cartridge housing opening 508. In one embodiment, as described in detail below, a drive from the retractor/crank mechanism 516 engages the chalk line support 510 within the cartridge housing 506 to enable retraction of the chalk line 512 into the cartridge housing 506.

Figure 8A:
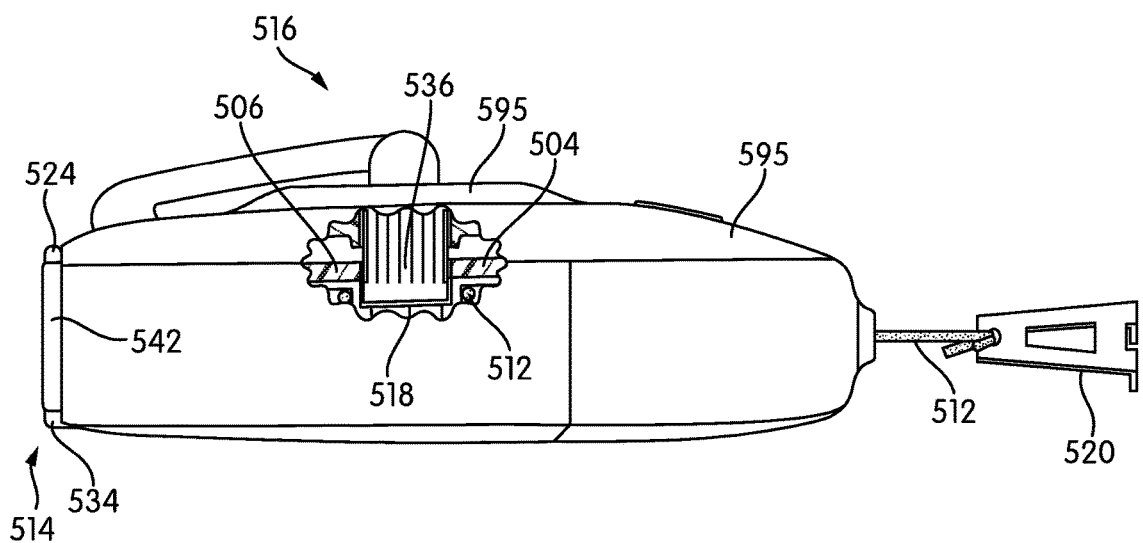
FIG. 8A shows a partial cross-sectional view of the chalk line device of FIG. 8 in accordance with an embodiment of the present patent application.

In one embodiment, the retractor 516 may include a gear arrangement as shown and described in detail with respect to FIGS. 4, 5, and 5a. In one embodiment, the entire gear arrangement is disposed in the housing 502 within a gear housing 595 (as shown in FIGS. 8 and 8A). That is, the entire gear arrangement is disposed outside the cartridge housing 506 of the cartridge assembly 504 and in the housing 502. For example, the gear arrangement of the housing 502 may include an inner ring gear, a spring, a pivot structure and a gear structure. The structure and operation of the inner ring gear, the spring, the pivot structure and the gear structure are described in detail with respect to FIGS. 4, 5, and 5a. When the reel winder of the housing 502 is rotated, a rotational motion is transferred via the pivot structure to its inner ring gear. In one embodiment, during the rotation of the inner ring gear, the teeth of the inner ring gear mesh with the teeth of the gear structure and thus rotate the gear structure.

In one embodiment, the gear structure disposed in the housing 502 has an axial extension 536 protruding therefrom. The axial extension 536 is configured to fit into a correspondingly shaped hole 518 of the cartridge housing 506 of the cartridge assembly 504 such that the operation (rotation) of the gear structure transfers the rotational motion to the chalk line support 510 of the cartridge assembly 504 via the axial extension 536 of the housing 502 fitted into the corresponding hole 518 of the cartridge housing 506.

In another embodiment, the retractor 516 may include a direct drive arrangement as shown and described in detail with respect to FIG. 3. In one embodiment, the retractor 516 of the chalk line device 500 may include a handle, a crank shaft and an integral hub. The retractor 516 may be connected to the chalk line support 510 via the crank shaft and may allow the chalk line 512 to be freely extended from the cartridge housing 506 through the cartridge housing opening 508 when the user pulls a chalk line hook 520 attached to a free end 521 of the chalk line 512. The retractor 516 also allows selective retraction of the chalk line 512 into the cartridge housing 506 when the user rewinds the chalk line 512 by rotating the handle.

The lock arrangement 514 is configured to lock the cartridge assembly 504 to the housing 502. The lock arrangement 514 is releasable to enable the cartridge assembly 504 to be disconnected from the housing 502 so as to be replaced by a new cartridge assembly 504a or 504b.

In one embodiment, the lock arrangement 514 includes a single lock arrangement disposed on an end 526 of the housing 502. In another embodiment, in addition to or alternative to the single lock arrangement, the lock arrangement 514 may include two lock arrangements on the side walls 528 and 530 of the housing 502. In one embodiment, the lock arrangement 514 may include portions 544 on the side walls 528 and 530 of the housing 502 that are configured to engage with portions 546 on the side walls of the cartridge assembly 504. In one embodiment, the portions 544 of the housing 502 are configured to resiliently flex to engage with the portions 546 of the cartridge assembly 504 and to lock the cartridge assembly 504 to the housing 502. In one embodiment, the resiliently flexible portions may be optional.

In one embodiment, the lock arrangement 514 may include snap latches that are configured to engage with corresponding structures on the cartridge assembly 504. In one embodiment, the lock arrangement 514 may include hooks that are configured to engage with corresponding structures on the cartridge assembly 504.

In one embodiment, the lock arrangement 514 may include a releasable latch 524 that is hingedly attached on the housing 502 for movement between latch and unlatch position to releasably latch the cartridge assembly 504 to the housing 502. In one embodiment, the releasable latch 524 may be configured to engage with a latch member receiving portion 532 disposed on the cartridge assembly 504. In one embodiment, the latch member receiving portion 532 may be in the form of a recess that is configured to receive a latch member 534 of the releasable latch 524. In one embodiment, the latch member 534 may be configured to slightly bend/flex outwardly as the releasable latch 524 is moved to the latch position where the latch member 534 engages with the latch member receiving portion 532 to lock the cartridge assembly 504 to the housing 502. To unlock the releasable latch 524, the latch member 534 may be resiliently flexed outwardly from the cartridge assembly 504 by user so as to withdraw the latch member 534 from the locking recess/latch member receiving portion 532 and to enable the cartridge assembly 504 to be disconnected from the housing 502.

In one embodiment, the releasable latch 524 holds the cartridge assembly 504 in the housing 502. In one embodiment, the cartridge assembly 504 is a sealed unit that may be connected to the crank housing/assembly 502 by snapping the cartridge assembly 504 into the housing 502. In one embodiment, by releasing the latch 524, the cartridge assembly 504 may be disconnected from the housing 502.

In one embodiment, when the chalk line device 500 is empty (or out of chalk) or when the user desires to change the chalk color, the existing cartridge assembly 504 is first removed from the housing 502. In one embodiment, the chalk line hook 520 is to be disconnected from the chalk line end 521 so as to enable the chalk line 512 to be retracted back through the chalk line opening 541 of the housing 502. In one embodiment, this can be done before or after removing the existing cartridge assembly 504 from the housing 502.

The cartridge assembly 504 may be removed from the housing 502 by resiliently flexing the latch member 534 of the releasable latch 524 outwardly from the cartridge assembly 504 so as to withdraw the latch member 534 of the releasable latch 524 from the latch member receiving portion 532 in the cartridge assembly 504 and to enable the cartridge assembly 504 to be disconnected from the housing 502. When the latch member 534 of the releasable latch 524 is withdrawn from the latch member receiving portion 532 in the cartridge assembly 504, the releasable latch 524 is rotated away from the cartridge assembly 504 in the direction arrow A. The cartridge assembly 504 may be removed from the housing 502. In one embodiment, an end portion 542 of the cartridge assembly 504 is first moved away from the housing 502 so as to enable the axial extension 536 of the housing 502 to be withdrawn the corresponding shaped hole 518 of the cartridge housing 506. The cartridge assembly 504 may then be removed from the housing 502 in an angled or tilted configuration outwardly away from the housing 502 so as to move from the front portion 522 of the cartridge assembly 504 out of engagement with the support surface 540 of the housing 502.

Once the cartridge assembly 504 is removed from the housing 502, a new cartridge may be inserted into the housing 502. In one embodiment, the chalk line 512 extending through the cartridge housing opening 508 of the new cartridge is configured to pass through the chalk line opening 541 of the housing 502. The chalk line hook 520 may then be connected to the chalk line end 521 of the chalk line 512 (passing through the chalk line opening 541 of the housing 502). The cartridge assembly 504 may be moved in an angled or tilted configuration inwardly towards the housing 502 so as to move the front portion 522 of the cartridge assembly 504 into engagement with the support surface 540 of the housing 502. The cartridge assembly 504 may then be moved into the housing 502 such that the axial extension 536 of the housing 502 is aligned and received by the corresponding hole 518 of the cartridge housing 506. The releasable latch 524 is then rotated towards from the cartridge assembly 504 in the direction arrow B. The latch member 534 of the releasable latch 524 may slightly bent/flexed outwardly as the releasable latch 524 is pushed to the latch position where the latch member 534 engages with the latch member receiving portion 532 to lock the cartridge assembly 504 to the housing 502.

FIG. 8A shows a partial cross-sectional view of the chalk line device of FIG. 8 in accordance with an embodiment of the present patent application. As shown in FIG. 8A, a new cartridge assembly 504 is inserted into the housing 502 and is connected to the housing 502. In one embodiment, as shown in FIG. 8A, when the cartridge assembly 504 is inserted into and connected to the housing 502, the axial extension 536 protruding from the retractor 516 of the housing 502 is received by the hole or opening 518 in the cartridge housing 506 of the cartridge assembly 504 such that operation of the retractor 516 transfers rotational motion to the chalk line support 510 of the cartridge assembly 504 (i.e., via the axial extension 536 fitted into the opening 518 of the cartridge housing 504). That is, the retractor 516 of the housing 502 is configured to drive the chalk line support 510 of the cartridge housing 506 of the cartridge assembly 504 to retract the chalk line 512 into the cartridge housing 506 such that the chalk line 512 is wound around the chalk line support 510 in the cartridge housing 506 and also to extend the chalk line 512 from the cartridge housing 506 through the chalk reservoir 591 in the cartridge housing 506 so as to cause the chalk line 512 to be coated with the chalk 593 disposed in the chalk reservoir 591.

In one embodiment, this design of reusable housing and replaceable cartridge is configured to eliminate the need to fill the chalk line device with chalk. In one embodiment, when the chalk line device is empty, the empty cartridge is removed and replaced with a new cartridge. That is, the empty cartridge is simply disconnected from the housing and a new cartridge is then connected to the housing. In another embodiment, when the user desires to change the chalk color, the user may simply replace the existing cartridge with a cartridge having the desired colored chalk. In one embodiment, this reduces or eliminates the mess when filling the chalk line device with chalk or when changing the color of the chalk of the chalk line device.

Figure 10:
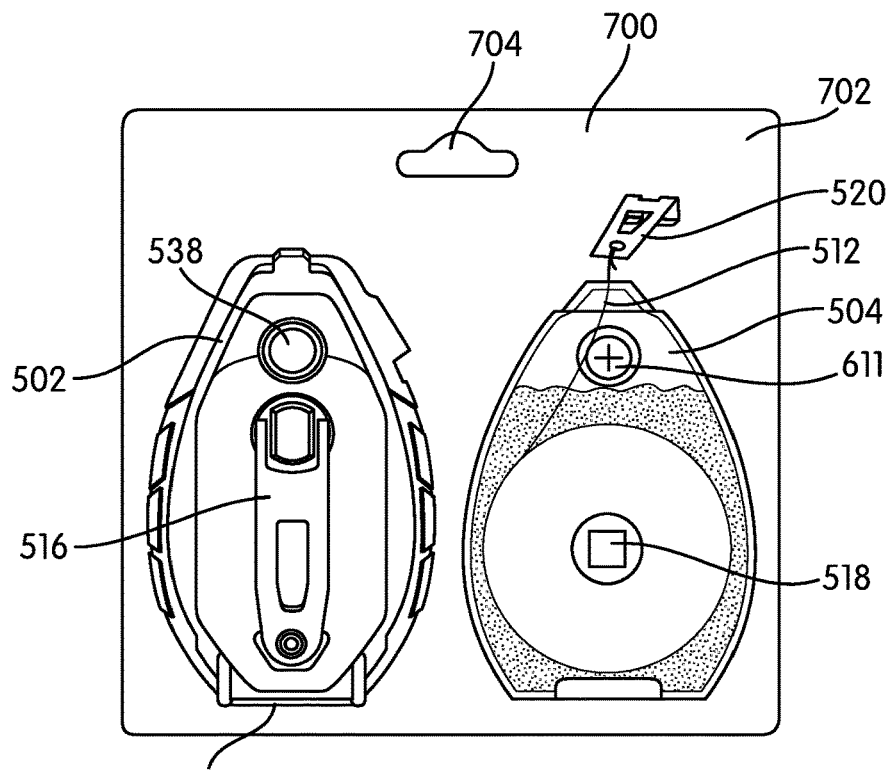
FIG. 10 shows a front elevational view of a starter package of the chalk line device of FIG. 8 in accordance with an embodiment of the present patent application.

FIGS. 10 and 11 show front elevational views of a starter package 700 of the chalk line device 500 and a refill package 800 of the chalk line device 500, respectively, in accordance with an embodiment of the present patent application. In one embodiment, the starter package 700 may generally include a backing card 702, the housing 502 and the cartridge assembly 504. In one embodiment, the refill package 800 may generally include a backing card 802, and the cartridge assemblies 504a and 504b.

In one embodiment, both the starter package 700 and the refill package 800 may include blister packs releasably secured to their backing cards 702 and 802, respectively. In one embodiment, the blister packs are optional.

In one embodiment, the refill package 800 may include only one cartridge assembly. In another embodiment, the number of the cartridge assemblies in the refill package 800 may vary. In one embodiment, the refill package 800 may include the cartridge assemblies having same colored chalk. In one embodiment, the refill package 800 may include the cartridge assemblies having different colored chalks. In the illustrated embodiment of FIG. 11, the refill package 800 includes the cartridge assemblies having different colored chalks.

The backing cards 702 and 802 are generally planar and are formed from a material such as paperboard, plastic or cardboard. The backing cards 702 and 802 each include a front surface that is intended to be viewed by a customer and a rear surface. In one embodiment, the front surface and/or the rear surface may have advertising or promotional information such as indicia (not shown) for identifying the product to the customers. In one embodiment, the front surface and/or the rear surface of the backing card 802 may have information for identifying the colors of the chalks (in the cartridge assemblies of the refill package 800) to the customers. In another embodiment, the rear surface may contain indicia (not shown) such as instructions for using the chalk line device 500. In one embodiment, the backing cards may include one or more openings therethrough to assist in securing the blister packs to the backing cards.

In use, the starter or refill package 700 and 800 may be configured to be positioned on a retail display rack for display and selection by the customers. The backing cards 702 and 802 each generally include hanger holes 704 and 804 formed near the upper edge of their respective backing cards 702 and 802. The hanger holes enables the packages to be hung on a hanger (not shown), such as a rack hooks or display rails on a display stand, for display to the consumers in a retail store. The hanger holes may be formed by cutting (e.g., stamping) away a piece of backing card material from the backing card in a shape sufficient to receive the hanger. The hanger holes as illustrated include a horizontal slot with an enlarged circular region in the center, however, it should be appreciated that the hanger holes may be configured in various shapes and sizes as would be appreciated by one skilled in the art. For example, in one embodiment, the packages may be positioned on the hanger using other hanging structures such as hooks attached to the back surface of the backing card, just for example.

The backing card 702 of the starter package 700 may include a cartridge engaging portion is configured to secure the cartridge assembly 504 to the backing card 702 and a housing engaging portion configured to secure the housing 502 to the backing card 702. The cartridge engaging portion and the housing engaging portion may each include one or more holes that constructed and arranged to receive means for attaching the cartridge assembly 504 and the housing 502 to the backing card 702. The attachment means may be configured to prevent the withdrawal of the cartridge assembly 504 and the housing 502 from the backing card 702, when the starter package 700 is on a retail display rack for display and selection by the customers.

The backing card 802 of the refill package 800 may include two cartridge engaging portions that are configured to secure two cartridge assemblies 504a and 504b to the backing card 802. The cartridge engaging portions may each include one or more holes that constructed and arranged to receive means for attaching the cartridge assemblies 504a and 504b to the backing card 802. The attachment means may be configured to prevent the withdrawal of the cartridge assemblies 504a and 504b from the backing card 802, when the refill package 800 is on a retail display rack for display and selection by the customers.

In various embodiments, the composition of the chalk material 24 can be of the type described in commonly assigned U.S. Patent Application Publication No. 200/0236442 that is hereby incorporated by reference in its entirety. In one embodiment, chalk material 24 suitable for use in the present disclosure can be composed of calcium carbonate, although the chalk may be of different types and/or contain other components such as minor impurities arising from deposition or mining. Chalk preparations, in some embodiments, may also include additional ingredients including, but not limited to, binding agents, drying agents, or inert ingredients. In one embodiment, the compositions of the chalk do not contain environmentally unfriendly components such as evaporated solvents and/or additives. In one embodiment, the chalk may include components that provide the chalk with waterproof characteristics.

In one embodiment, the chalk may include a plurality of colorants. In another embodiment, the chalk does not contain a colorant. Colorants for use in the present disclosure may include any colorant suitable for mixing with chalk to prepare the desired composition chalk. Colorants may be selected on the basis of desired properties for a given application including hue (color), stability, durability, and penetration. Generally, any colorant known to be suitable for coloring chalk for use in a chalk line device, is suitable for use in the present disclosure. Suitable colorants may be mineral ores, naturally occurring colored pigments, or synthetic dyes including, but not limited to, iron oxides (e.g., hematite), ultramarine, malachite, inks, or synthetic pigments. In one embodiment, synthetic iron oxides in yellow, red, black or brown pigment formulations may be used. It is understood that the term "colorant" as used herein includes colorant preparations that contain other ingredients in addition to the material being used to provide color. For example, iron oxide-containing colorant preparations may include calcium carbonate and silicon dioxide. It is understood that colorant formulations can be added to the mixture in an amount ranging from about 10% to about 30% by weight, for example, in an amount of about 20% by weight. It is understood that more than one colorant may be used in the compositions and methods of the present disclosure.

In one embodiment, the embodiments of the chalk line device with the valve 11, the secondary chalk reservoir 152 or the cartridge assembly 504, 504a, 504b may be used with a liquid composition chalk, a powered chalk, or a liquid composition chalk that forms a powder when exposed to atmosphere as described in detail below.

The chalk line device of the present patent application may include a liquid composition chalk disposed in the chalk reservoir. In one embodiment, the liquid composition chalk provided on the chalk line when the chalk line is extended from the housing forms a powder when exposed to atmosphere. In one embodiment, the liquid composition chalk is configured to be less susceptible to moisture than the powdered chalk. In one embodiment, when the liquid composition chalk is disposed in the chalk reservoir, the housing is constructed and arranged to mechanically seal the chalk reservoir so as to prevent the liquid composition chalk from leaking from the chalk reservoir. In one embodiment, the housing is constructed and arranged to prevent the liquid composition chalk from leaking from the chalk line opening. In one embodiment, the chalk reservoir and the housing are both constructed and arranged such that they do not allow the liquid composition chalk stored in the chalk reservoir to leak out from any seams, from a nose portion/chalk line opening of the housing where the chalk line exits and from around the retractor. In one embodiment, the chalk housing is designed with a seal chamber that does not allow the liquid composition chalk to leak out from any seams or openings. In one embodiment, the liquid composition chalk is configured to operate with the chalk line even if the chalk line became substantially wet during use. In one embodiment, the liquid composition chalk is configured to operate with the chalk line even if moisture gets inside the housing. In one embodiment, the chalk line with the liquid composition chalk provided thereon and extending from the housing through the chalk line opening is configured to be wet. In one embodiment, the liquid composition chalk provided on the chalk line is configured to dry when exposed to the atmosphere to form the powder chalk such that the powder chalk on the chalk line is deposited or discharged onto a surface when the chalk line is snapped. In one embodiment, an interface between the liquid composition chalk dispensing bottle and chalk housing is sealed by the seal member to prevent spillage when the liquid composition chalk is being filled. In one embodiment, the liquid composition chalk is dispensed from the liquid composition chalk dispensing bottle to the chalk reservoir with less mess to the user. In one embodiment, the liquid composition chalk provides an easy fill method of filling the chalk housing.

In one embodiment, the liquid composition chalk (or wet chalk) disposed inside the housing dries to form chalk powder when the chalk line is extended from the housing and exposed to atmosphere, air or Ultra Violet (UV) rays. In one embodiment, the liquid composition chalk becomes powder after exposure to the atmosphere. The liquid composition chalk transforms to a solid state (powder) chalk when the chalk line is extended from the housing and exposed to a flow or stream of air or other gases. In one embodiment, the liquid composition chalk may be erased easily. In one embodiment, when compared to the powered composition chalk, the liquid composition chalk is configured to reduce the amount of chalk debris outside of the chalk housing when the chalk line is extended or retracted. In one embodiment, there will be less loose chalk debris when the chalk line is extended from or retracted into the housing. In one embodiment, the liquid composition chalk is configured to be less susceptive to moisture than dry chalk which clumps. In one embodiment, the liquid composition chalk is waterproof and is configured to function even if the chalk line is wet or if moisture gets inside the chalk housing. In one embodiment, the liquid composition chalk is configured to be less susceptible to the negative effects of moisture.

In one embodiment, the chalk line 16 is extended wet and the liquid composition chalk dries within seconds and allows the chalk to come off the chalk line 16 dry or in a powder form when snapped.

The chalk line device of the present patent application may also include a vacuum structure. The vacuum structure is configured to create a negative pressure within the housing to draw excess chalk on the chalk line towards the chalk reservoir when the chalk line is being extended from the housing. For example, in one embodiment, the chalk reel has a built vacuum system that runs off the chalk line support. In one embodiment, when the chalk line is extended, the chalk line support or reel turns and drives the vacuum system which sucks in any chalk dust that is released from the chalk line as it is extended. In one embodiment, an impeller connected to the chalk line support spins when the chalk line is extended or retracted and creates a vacuum to pull any loose chalk back into the housing. In one embodiment, when the chalk line is extended from or retracted into the chalk line device with the vacuum structure, there will be less loose chalk debris.

In one embodiment, the chalk line device 10 may include a non-cranking chalk line support. In one embodiment, the chalk line device may include an auto rewind chalk line support so as to eliminate the need for the manual rewind.

For example, the chalk line device 10 may include a spring loaded lock mechanism that is configured to operate to store energy for retracting the chalk line 16 into the housing 12 when the chalk line 16 is extended out of the housing 12. Such spring loaded lock mechanism may also include an auto lock button or actuator that is pushed/pressed to retract the chalk line 16 into the housing 12.

In one embodiment, the housing 12 of the chalk line device 10 may be configured to hold 25% or more chalk than a standard size chalk line device while still maintaining the same housing dimensions as that of the standard chalk line device. This is done by reducing the length of the chalk line in the standard size (chalk line device) housing. Thus, increasing the volume of the chalk reservoir that receives the chalk. In one embodiment, 70 feet chalk line (of the standard 100 feet chalk line) is removed to increase the chalk capacity of the chalk line device. In one embodiment, a standard (100 feet) size chalk line device is provided to the end user with only 20 feet or 30 feet chalk line and with increased chalk capacity.

In one embodiment, the present patent disclosure provides a disposable chalk line device. The disposable chalk line device includes chalk material already loaded therein. The user may simply purchase such disposable chalk line device, use and dispose it thereafter. The disposable chalk line device does not require refill/filling. The disposable chalk line device is easy to use and has no chalk clumping issues (as the device will be used and disposed thereafter). In one embodiment, the disposable chalk line device may be made from flexible, plastic material.

In one embodiment, a closure may be secured to the housing 12 over the chalk port or receptacle 17 to selectively open and close the chalk receptacle 17. However, it is contemplated that any suitable closure mechanism may be used including a moveable door, a hinged door, a sliding door or a self-sealing access port. In one embodiment, the housing 12 may include an annular seal member (e.g., made of an elastomeric material or rubber) surrounding the chalk port or receptacle 17 so as to provide a seal around the chalk port or receptacle 17 both when closure closes the chalk receptacle 17 and when the closure opens the chalk receptacle 17 such that the chalk receptacle 17 receives a nozzle of a chalk dispensing bottle. In one embodiment, the seal surfaces of the seal member may create tight seals between the closure and the housing 12 when the closure closes the chalk receptacle 17. In one embodiment, the seal member may have seal surfaces creating tight seals between the chalk dispensing bottle and the housing 12 when the chalk receptacle 17 receives the nozzle of the liquid composition chalk dispensing bottle. A tight seal may be created by the weight/force of the chalk dispensing bottle pressing down on the sealing surfaces. In one embodiment, the annular seal member may be optional. In one embodiment, the closure includes an elastomeric material enabling the closure to seal with the housing 12 when the closure is closed to prevent leakage of the liquid composition chalk at an interface between the closure and the housing 12. The closure may include a release lock is arranged to releasably lock the closure in the closed position. In various embodiments, the structure of the releasably lock and the closure with elastomeric material can be of the type described in commonly assigned U.S. Pat. No. 8,713,810 that is hereby incorporated by reference in its entirety.

FIGS. 12-19 show a chalk line device 1010 that includes a housing 1012, a reel 1014 (as shown in FIGS. 16-19) mounted for rotation within the housing 1012, a liquid container 1016 (as shown in FIGS. 16-19) disposed within the housing 1012, and a handle 1020 connected with the reel 1014 and extending outside the housing 1012. The reel 1014 is constructed and arranged to carry a chalk line 1018 wound thereon. The liquid container 1016 has a sealed configuration and an unsealed configuration. In the unsealed configuration, the liquid container 1016 is configured to receive liquid chalk 1022 therein, and, in the sealed configuration, the liquid container 1016 substantially seals the liquid chalk 1022 received therein. The reel 1014 is positioned in the liquid container 1016 such that the chalk line 1018 wound therein is at least partially submerged in the liquid chalk 1022 received in the liquid container 1016. The handle 1020 is operable to wind up the chalk line 1018 onto the reel 1014.

In one embodiment, the housing 1012 may be formed of a plastic material or a composite material. In one embodiment, the housing 1012 may be formed of a die-cast metal material. In one embodiment, the housing 1012 may be formed of a die-cast aluminum material. In another embodiment, the housing 1012 may be formed of a metal material, a hybrid material or any other suitable material or a combination of materials. In another embodiment, the housing 1012 may be formed of a water-resistant, high-impact Acrylonitrile butadiene styrene (ABS) material.

In one embodiment, the housing 1012 may be integrally formed. In one embodiment, the housing 1012 may include a first housing portion 1012a and a second housing portion 1012b.

In one embodiment, when the liquid chalk 1022 is disposed in the liquid container 1016, the housing 1012 (including the first and second housing portions 1012a and 1012b) is constructed and arranged to mechanically seal the liquid container 1016 so as to prevent the liquid chalk 1022 from leaking from the liquid container 1016. In one embodiment, the housing 1012 is designed such that it does not allow the liquid chalk 1022 to leak out from any seams or openings of the housing 1012.

Figure 22:
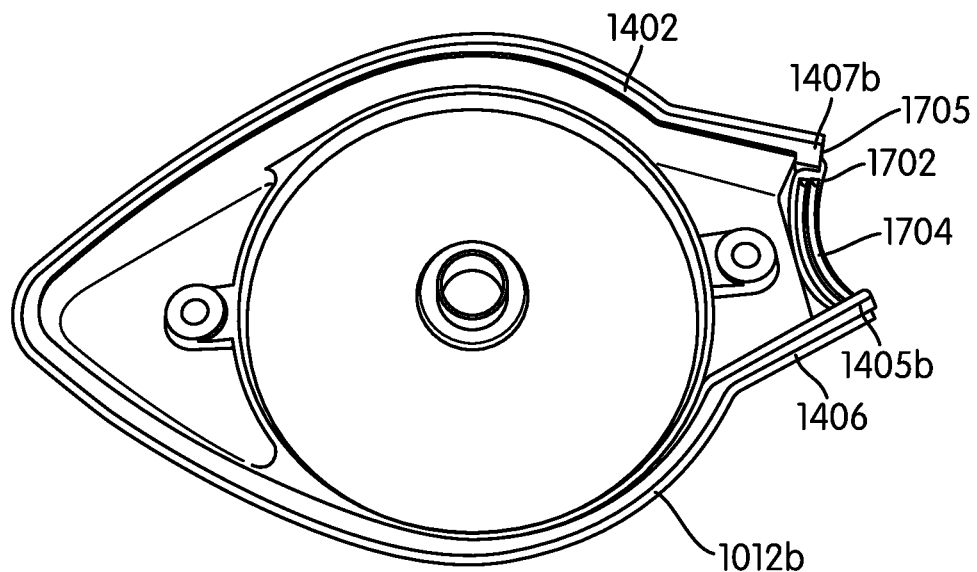
FIG. 22 shows a side perspective view of a portion of the housing of the chalk line device in accordance with an embodiment of the present patent application.
Figure 23:
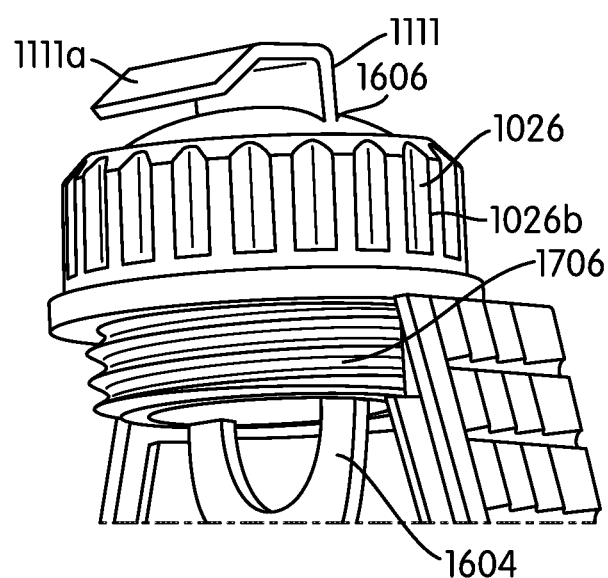
FIG. 23 shows a partial, front perspective view of the chalk line device in accordance with an embodiment of the present patent application, some of the portions of the chalk line device in FIG. 23 are removed to better illustrate the construction of the remaining portions of the chalk line device.

In one embodiment, the first and second housing portions 1012a and 1012b are sealed using a seal member 1402 (as shown in FIG. 23). That is, the seal member 1402 is constructed and arranged to be mounted between the first and second housing portions 1012a and 1012b. The seal member 1402 may have a first portion and a second portion. The first and second portions of the seal member 1402 are constructed and arranged to be positioned within seal member receiving portions 1404 and 1406 (as shown in FIGS. 16-19, 20 and 22) of the first and second housing portions 1012a and 1012b, respectively when the first and second housing portions 1012a and 1012b of the chalk line device 1010 are tightened or sealed against each other. In one embodiment, the seal member receiving portions 1404 and 1406 of the first and second housing portions 1012a and 1012b may be in the form of grooves. In one embodiment, the seal member receiving portions 1404 and 1406 of the first and second housing portions 1012a and 1012b may be in the form of complementary ribs that are positioned to receive the seal member 1402 therebetween. In one embodiment, the seal member 1402 is configured to prevent not only the leakage of the liquid chalk 1022 but also penetration of dirt, humidity, etc. from an outside environment into the liquid chalk 1022 stored in the housing 1012.

In one embodiment, the seal member 1402 may be made of an elastomeric material. In one embodiment, the seal member 1402 may be made of a rubber material. In one embodiment, the seal member 1402 may be made of a resilient material, a flexible material, or a deformable material. In one embodiment, the seal member or gasket 1402 may have a generally U-shaped configuration extending from first portions 1405*a*, 1405*b* of the first and second housing portions 1012*a* and 1012*b* to second portions 1407*a*, 1407*b* of the first and second housing portions 1012*a* and 1012*b*.

In one embodiment, the housing 1012 may include an overmolded covering made, for example, of an elastomeric material, on a side exterior surface to facilitate easy gripping by a user. The overmolded covering may also optionally include one or more grip formations (e.g., undulations, ridges, grooves or other textured formations) for providing enhanced grip. These grip formations provide the user with a less slippery surface to grip and handle the chalk line device 1010.

In one embodiment, the housing 1012 includes a translucent window that allows the user to check the level of the liquid chalk 1022 remaining in the liquid container 1016. In various embodiments, the structure of the translucent window can be of the type described in commonly assigned U.S. Patent Application Publication No. 2008/0236442 that is hereby incorporated by reference in its entirety. In one embodiment, the translucent window may also allow the user to check the color of the liquid chalk 1022 stored in the liquid container 1016.

In one embodiment, the housing 1012 comprises a chalk line opening 1028. The chalk line opening 1028 is configured to receive a portion of the chalk line 1018 therethrough. That is, the chalk line 1018 is operatively connected with the reel 1014 and is arranged to extend through the chalk line opening 1028.

In one embodiment, the housing 1012 defines an interior space that includes the reel 1014. That is, the reel 1014 is rotatably mounted in the interior space in the housing 1012. In one embodiment, the reel 1014 may be formed of a plastic material or a composite material. In another embodiment, the reel 1014 may be formed of a metal material, a hybrid material or any other suitable material or combination of materials. The chalk line 1018 is operatively connected to the reel 1014.

In one embodiment, the reel 1014 may be shaped to have two extended discs 1014*a* and 1014*b* connected to one another by a central hub. In one embodiment, the reel 1014 may be an integrally formed structure.

In one embodiment, the two extended discs 1014*a* and 1014*b* of the reel 1014 may be perforated to permit the liquid chalk 1022 in the liquid container 1016 to easily flow to the chalk line 1018 wound on the central hub of the reel 1014. That is, in one embodiment, each of the two extended discs 1014*a* and 1014*b* of the reel 1014 may include an array of through holes or perforations or apertures 1150. In the illustrated embodiment, the through holes or perforations or apertures 1150 are arranged in a single, circumferentially array on their respective extended discs 1014*a* and 1014*b* of the reel 1014. However, it is contemplated that the through holes or perforations or apertures 1150 may be arranged in a variety of patterns (e.g., a regular, an irregular, or a random patterns) on their respective extended discs 1014*a* and 1014*b* so as to permit the liquid chalk 1022 in the liquid container 1016 to easily travel or flow to the chalk line 1018 wound on the central hub of the reel 1014. In one embodiment, the number of through holes or perforations or apertures 1150 on the respective extended discs 1014*a* and 1014*b* may vary. In the illustrated embodiment, the through holes or perforations or apertures 1150 have generally trapezoidal shaped configurations. In other embodiments, the through holes or perforations or apertures 1150 may have any shape configurations that permit the liquid chalk 1022 in the liquid container 1016 to easily pass to the chalk line 1018 wound on the central hub of the reel 1014. In one embodiment, the through holes or perforations or apertures on the extended discs 1014*a* and 1014*b* of the reel 1014 are optional.

In one embodiment, the central hub or shaft of the reel 1014 may have longitudinally extending channels or passageways on an outer surface thereof. In one embodiment, the longitudinally extending outer passageways on the hub of the reel 1014 are configured to facilitate more of the liquid chalk 1022 in the liquid container 1016 to easily pass to the chalk line 1018 wound on the reel 1014. In one embodiment, the longitudinally extending outer passageways on the hub of the reel 1014 are optional.

In one embodiment, the chalk line device 1010 may include a retractor that is mounted to the housing 1012 and is operable to retract the chalk line 1018 into the housing 1012 and allow the chalk line 1018 to be extended from the housing 1012 through the chalk line opening 1028. In one embodiment, the retractor is configured to drive the reel 1014 to retract the chalk line 1018 into the housing 1012 through the liquid container 1016 such that the chalk line 1018 is wound around the reel 1014. In one embodiment, the retractor is configured to drive the reel 1014 to extend the chalk line 1018 from the housing 1012 through the liquid container 1016 so as to cause the chalk line 1018 to absorb with the liquid chalk 1022 disposed in the liquid container 1016. The retractor is operatively connected to the reel 1014 and allows the chalk line 1018 to be freely extended from the housing 1012 through the chalk line opening 1028 when the user pulls a chalk line hook 1111 attached to a free end of chalk line 1018. The retractor also allows selective retraction of the chalk line 1018 into the housing 1012 when the user rewinds the chalk line 1018 by rotating the handle 1020.

In one embodiment, the retractor of the chalk line device 1010 may include a direct drive mechanism and may include the handle 1020, a crank shaft 1302 and an integral hub. In one embodiment, the structure and operation of the direct drive mechanism of the retractor of the chalk line device 1010 can be of the type described in commonly assigned U.S. Pat. No. 7,913,408 that is hereby incorporated by reference in its entirety.

In one embodiment, the retractor of the chalk line device 1010 may include a gear arrangement or mechanism. In one embodiment, the structure and operation of the gear arrangement or mechanism of the retractor of the chalk line device 1010 can be of the type described in commonly assigned U.S. Pat. No. 8,713,810 that is hereby incorporated by reference in its entirety. Of course, in other embodiments, any known retracting and spooling mechanisms could be used.

In one embodiment, the chalk line device 1010 may include a non-cranking reel. In one embodiment, the chalk line device 1010 may include an auto rewind reel so as to eliminate the need for the manual rewind. For example, the chalk line device 1010 may include a spring loaded lock mechanism that is configured to operate to store energy for retracting the chalk line 1018 into the housing 1012 when the chalk line 1018 is extended out of the housing 1012. Such spring loaded lock mechanism may also include an auto lock button or actuator that is pushed/pressed to retract the chalk line 1018 into the housing 1012.

In one embodiment, the interior space of the housing 1012 includes the liquid container 1016. The liquid container 1016 is in communication with a filler opening 1024 and into which liquid chalk 1022 can be stored when received from the filler opening 1024. In one embodiment, the liquid container 1016 is operatively disposed between the reel 1014 and the chalk line opening 1028 in the housing 1012. The chalk line 1018 is configured to pass through the liquid container 1016 before passing through the chalk line opening 1028. In one embodiment, the liquid container 1016 may be configured to have a capacity for holding between 1 and 5 ounces of the liquid chalk 1022 therein.

In one embodiment, the chalk line 1018 has one end secured to the reel 1014 within the housing 1012 and another end (or free end) provided with the chalk line hook 1111 disposed outside of the housing 1012. The chalk line 1018 is spooled around the reel 1014. In one embodiment, the chalk line 1018 may extend along a straight line tangentially from the central hub or the reel 1014 towards the chalk line opening 1028. Upon application of a pulling force on the chalk line hook 1111 by the user, portions of the chalk line 1018 straighten out and apply a rotation force to the reel 1014 (or its central hub). The reel 1014 (or its central hub) may thus be rotated when the chalk line 1018 is pulled.

The chalk line 1018 may be wound on the reel 1014 when the handle 1020 of the retractor is operated by the user. It is to be noted that although the chalk line 1018 is moved in and out of housing 1012 using the handle 1020 of the retractor, in other embodiments, the chalk line 1018 may be moved into the housing 1012 using a one-way spring loaded winding mechanism that pulls the chalk line 1018 into the housing 1012. The chalk line 1018 may be pulled out of housing 1012 by the user pulling, for example, on the chalk line hook 1111 attached to the free end of the chalk line 1018 (e.g., attached at a distal end of the chalk line 1018). This may be facilitated by the user pushing in on the spring biased hub portion. In yet another embodiment, the chalk line 1018 may be wound or unwound using a small battery operated motor attached to and/or inside housing 1012.

In one embodiment, the chalk line 1018 is made of a material that facilitates the adherence of the liquid chalk 1022 thereto or absorption of the liquid chalk 1022 therein for marking a surface or surfaces. In one embodiment, the chalk line 1018 includes a composition of cotton and nylon material. In one embodiment, the chalk line 1018 is at least partially water absorbent. In one embodiment, the chalk line 1018 is made of a material that resists breakage and fraying. In one embodiment, the chalk line 1018 is made of a material that has abrasion resistance. In one embodiment, the chalk line 1018 may be configured to have a fast liquid absorption. For example, on the first fill of the liquid chalk 1022 in the liquid container 1016, the chalk line 1018 is configured to absorb the liquid chalk 1022 be ready to provide markings within 1 minute.

In one embodiment, the chalk line hook 1111 may include a through-hole 1111c for fastening the chalk line 1018, and another hole 1111b for hanging chalk line device 1010, for example, on a nail in a wall for storage. Alternatively, the hole 1111b may also be used to fix the chalk line 1018 to a projecting member or a work-piece where more suitable than claws 1111a.

In one embodiment, the chalk line hook 1111 may be made of a metal material or a plastic material. In one embodiment, the chalk line hook 1111 may be made of a stainless-steel metal material. In another embodiment, the chalk line hook 1111 may be made of composite or hybrid materials as would be appreciated by one skilled in the art. In various embodiments, the structure of the chalk line hook 1111 can be of the type described in commonly assigned U.S. Pat. Nos. 6,915,587; 7,913,408; and 8,713,810 that are hereby incorporated by reference in their entirety.

In one embodiment, when the chalk line device 1010 is not in use, the hole 1111b may also be used to attach the chalk line hook 1111 to the housing 1012 over a protrusion disposed on an exterior or outer surface of the housing 1012. In various embodiments, the structure of the protrusion can be of the type described in commonly assigned U.S. Pat. No. 8,713,810 that is hereby incorporated by reference in its entirety. In another embodiment, other mechanisms for resting the chalk line hook 1111 may be used, for example, a snap-on clip. In yet another embodiment, the exterior surface of housing 1012 may include a depression or elongated opening formed therein that is shaped to receive the chalk line hook for storage. In various embodiments, the structure of the depression/elongated opening can be of the type described in commonly assigned U.S. Patent Application Publication No. 2008/0236442 that is hereby incorporated by reference in its entirety. In yet another embodiment, the protrusion, depression, or snap-on clip may be optional and the chalk line hook 1111 may simply hang from the chalk line device 1010.

In one embodiment, the chalk line hook 1111 may be in the form of an interlocking hook or an upset hook that is constructed and arranged to prevent evaporation of the liquid chalk 1022 from the chalk line 1018.

In one embodiment, the chalk line device 1010 may include a portion 1602 that is configured to be inserted into the chalk line opening 1028, when the chalk line device 1010 is not in use, so as to prevent evaporation of the liquid chalk 1022 from the chalk line 1018. In one embodiment, the portion 1602 is formed on the end portion of the chalk line 1018 and is connected (releasably or otherwise) to a portion 1603 of the chalk line hook 1111 so as to connect the chalk line 1018 to the chalk line hook 1111. In one embodiment, the portion 1602 is formed on the chalk line hook 1111 and is configured to receive the end portion of the chalk line so as to connect the chalk line 1018 to the chalk line hook 1111.

In one embodiment, as shown in FIG. 23, a portion 1604 of the chalk line hook 1111 is configured to be inserted into a top opening 1606 of the housing 1012, when the chalk line device 1010 is not in use, so as to prevent evaporation of the liquid chalk 1022 from the chalk line 1018. In one embodiment, the top opening 1606 of the housing 1012 may include the chalk line opening 1028. In one embodiment, the top opening 1606 of the housing 1012 is sized and configured to receive the chalk line hook 1111 therein. In one embodiment, the top opening 1606 of the housing 1012 is sufficiently wide to accommodate the width dimension of the chalk line hook 1111. In one embodiment, the claws 1111a of the chalk line hook 1111 are positioned outside the housing 1012 when the chalk line device 1010 is not in use and the portion 1604 of the chalk line hook 1111 is inserted into the top opening 1606 of the housing 1012.

Although the chalk line hook 1111 is shown in the figures of these patents having a certain shape or form, it is also within the scope of the present disclosure to have various shapes or form.

In one embodiment, the chalk line 1018 wound on the reel 1014 is at least partially submerged in the liquid chalk 1022 in the liquid container 1016 such that the chalk line 1018 receives and absorbs the liquid chalk 1022 in the liquid container 1016. In one embodiment, the rotation of the reel 1014 causes the entire surface of the reel 1014 and the chalk line 1018 wound thereon to be exposed to the liquid chalk 1022 in the liquid container 1016.

In one embodiment, the reel 1014 is fully submerged in the liquid chalk 1022 in the liquid container 1016 such that the entire chalk line 1018 receives and absorbs the liquid chalk 1022. In one embodiment, half of the reel 1014 is submerged in the liquid chalk 1022 in the liquid container

1016 such that half of the chalk line 1018 receives and absorbs the liquid chalk 1022 and the other half of the chalk line 1018 receives and absorbs the liquid chalk 1022 during the rotation of the reel 1014 when the chalk line 1018 wound on the reel 1014 is exposed to the liquid chalk 1022 in the liquid container 1016. In one embodiment, one third of the reel 1014 is submerged in the liquid chalk 1022 in the liquid container 1016 such that one third of the chalk line 1018 receives and absorbs the liquid chalk 1022 and the other two thirds of the chalk line 1018 receives and absorbs the liquid chalk 1022 during the rotation of the reel 1014 when the chalk line 1018 wound on the reel 1014 is exposed to the liquid chalk 1022 in the liquid container 1016. In one embodiment, two thirds of the reel 1014 is submerged in the liquid chalk 1022 in the liquid container 1016 such that two thirds of the chalk line 1018 receives and absorbs the liquid chalk 1022 and the other one third of the chalk line 1018 receives and absorbs the liquid chalk 1022 during the rotation of the reel 1014 when the chalk line 1018 wound on the reel 1014 is exposed to the liquid chalk 1022 in the liquid container 1016.

In one embodiment, the chalk line device 1010 further may include a clip that is pivotally attached to the exterior wall or surface of the housing 1012. The clip may be spring biased at the point of its attachment (to the housing 1012) to allow biasing the clip toward the exterior wall of the housing 1012. The clip may be used, for example, to hold the chalk line device 1010 on a support. For instance, the clip may be slid in a belt or on a pocket rim of a user to allow easy retrieval and storage. In one embodiment, such a clip may be disposed on the side wall/surfaces 1900 or 1902 or any other exterior or outer surface portion of the housing 1012.

In one embodiment, the filler opening 1024 is configured to receive the liquid chalk 1022 therethrough for receipt into the liquid container 1016. When the liquid chalk 1022 in the chalk line device 1010 runs out, the chalk line device 1010 may be filled with additional liquid chalk from a liquid chalk dispensing bottle. For example, the additional liquid chalk may be introduced into the liquid container 1016 through the chalk filler opening 1024. In one embodiment, an interface between the liquid chalk dispensing bottle and the chalk housing 1012 is sealed by a seal member to prevent spillage when the liquid chalk 1022 is being filled in the liquid container 1016. In one embodiment, the chalk line device 1010 may include a valve that has sealing surfaces configured to seal with a nozzle of a liquid chalk bottle for providing liquid chalk to the filler opening 1024. In one embodiment, the liquid chalk 1022 is dispensed from the liquid chalk dispensing bottle to the liquid container 1016 with less mess to the user. In one embodiment, the liquid chalk 1022 provides an easy fill method of filling the chalk housing 1012.

In one embodiment, the filler opening 1024 or 1024a may be disposed on a side wall 1900 of the housing 1012. In another embodiment, the filler opening 1024a may be disposed on a side wall 1902 of the housing 1012 or may be disposed on any other portion of the housing 1012. In another embodiment, the filler opening 1024 or 1024b may be disposed on a top wall 1904 of the housing 1012.

In one embodiment, the chalk line device 1010 includes a seal structure 1026 that is configured to selectably seal the filler opening 1024 in a water or fluid tight sealing relation.

In one embodiment, the seal structure 1026 includes a movable door 1026a that is operatively associated with the filler opening 1024. In one embodiment, the movable door 1026a is moveable between a sealed configuration in which the movable door 1026a is configured to substantially seal the filler opening 1024 and an unsealed configuration in which the movable door 1026a is configured to be open to enable the liquid chalk 1022 to be introduced to the liquid container 1016 through the filler opening 1024. In one embodiment, in the sealed configuration, the movable door 1026a is configured to close the filler opening 1024 in a fluid tight sealing relation. That is, the movable door 1026a may be secured to the housing 1012 over the filler opening 1024 to selectively open and close the filler opening 1024. However, it is contemplated that any suitable seal structure may be used including a hinged door, a sliding door or a self-sealing access port.

In one embodiment, the movable door 1026a may include an annular seal member (e.g., made of an elastomeric material or a rubber material) formed or positioned around its periphery. The seal member is configured to create a fluid-tight closure when the movable door 1026a is closed and latched/locked/sealed against a portion of an outer surface of the housing 1012 surrounding the filler opening 1024. In another embodiment, the housing 1012 may include an annular seal member (e.g., made of an elastomeric material or rubber) surrounding the filler opening 1024 so as to provide a seal around the filler opening 1024 when the movable door 1026a closes the filler opening 1024. In one embodiment, seal surfaces of the annular seal member (i.e., positioned on the movable door 1026a or the housing 1012) may create tight seals between the movable door 1026a and the housing 1012 when the movable door 1026a closes the filler opening 1024. In one embodiment, the annular seal member (i.e., positioned on the movable door 1026a or the housing 1012) is configured to prevent leakage of the liquid chalk at an interface between the movable door 1026a and the housing 1012. The movable door 1026a may include a release lock is arranged to releasably lock the movable door 1026a in the closed position. In various embodiments, the structure of the releasably lock and the seal structure can be of the type described in commonly assigned U.S. Pat. No. 8,713,810 that is hereby incorporated by reference in its entirety.

Figure 21:
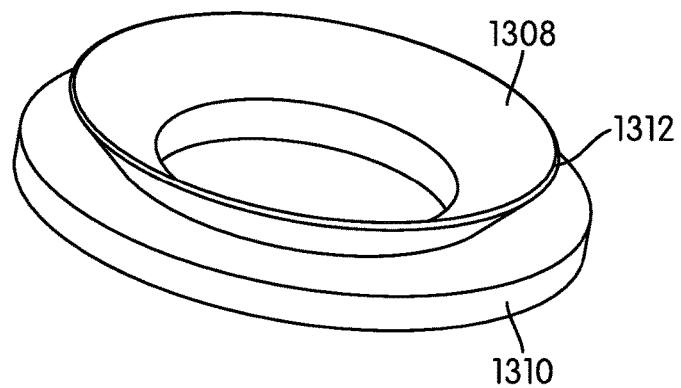
FIG. 21 shows a front perspective view of a seal member of the chalk line device that is configured to seal a crank shaft of a retractor and a housing of the chalk line device in a water or fluid tight sealing relation in accordance with an embodiment of the present patent application.

In one embodiment, the seal structure 1026 may include a closure member 1026b that is moveable between the sealed configuration and the unsealed configuration. In one embodiment, the closure member 1026b may be a closure cap. In one embodiment, the closure member 1026b may be a twistable cap. In one embodiment, as shown in FIGS. 21-23, a cylindrical sleeve member 1702 may be (permanently) attached to the housing 1012. In one embodiment, the sleeve member 1702 may have a threaded portion or threads 1704 on its internal surface 1705 that are configured to mate with a complementary threaded portion or threads 1706 on the outer surface 1707 of the closure member 1026b to effect a fluid tight seal between the closure member 1026b and the filler opening 1024. In another embodiment, the sleeve member 1702 may have a threaded portion or threads on its external surface that are configured to mate with a complementary threaded portion or threads on the inner surface of the closure member 1026b to effect a fluid tight seal between the closure member 1026b and the filler opening 1024. In yet another embodiment, the closure member 1026b and a top portion of the housing 1012 may have a tight (snap) friction fit arrangement therebetween to effect a fluid tight seal between the closure member 1026b and the filler opening 1024.

Figure 17:
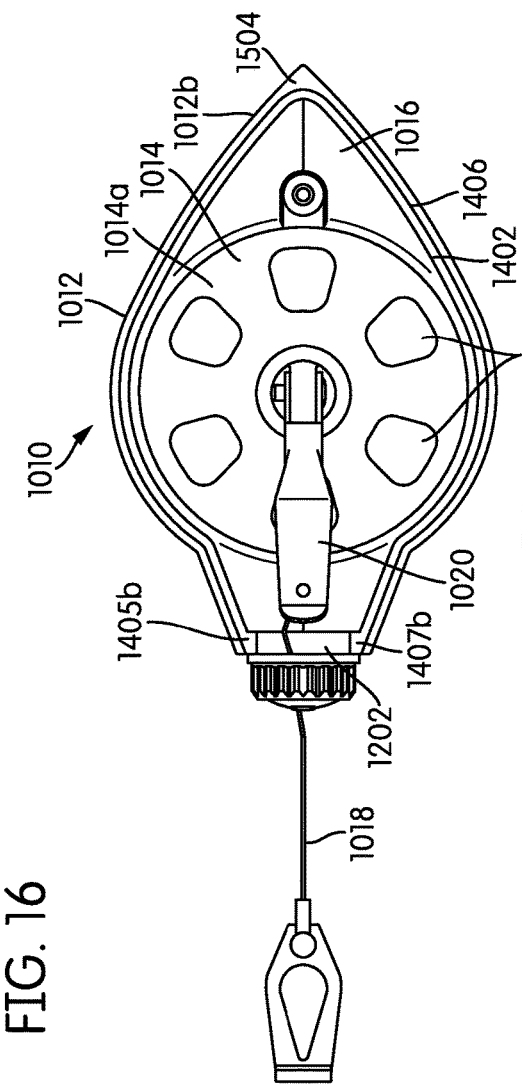
Figure 18:
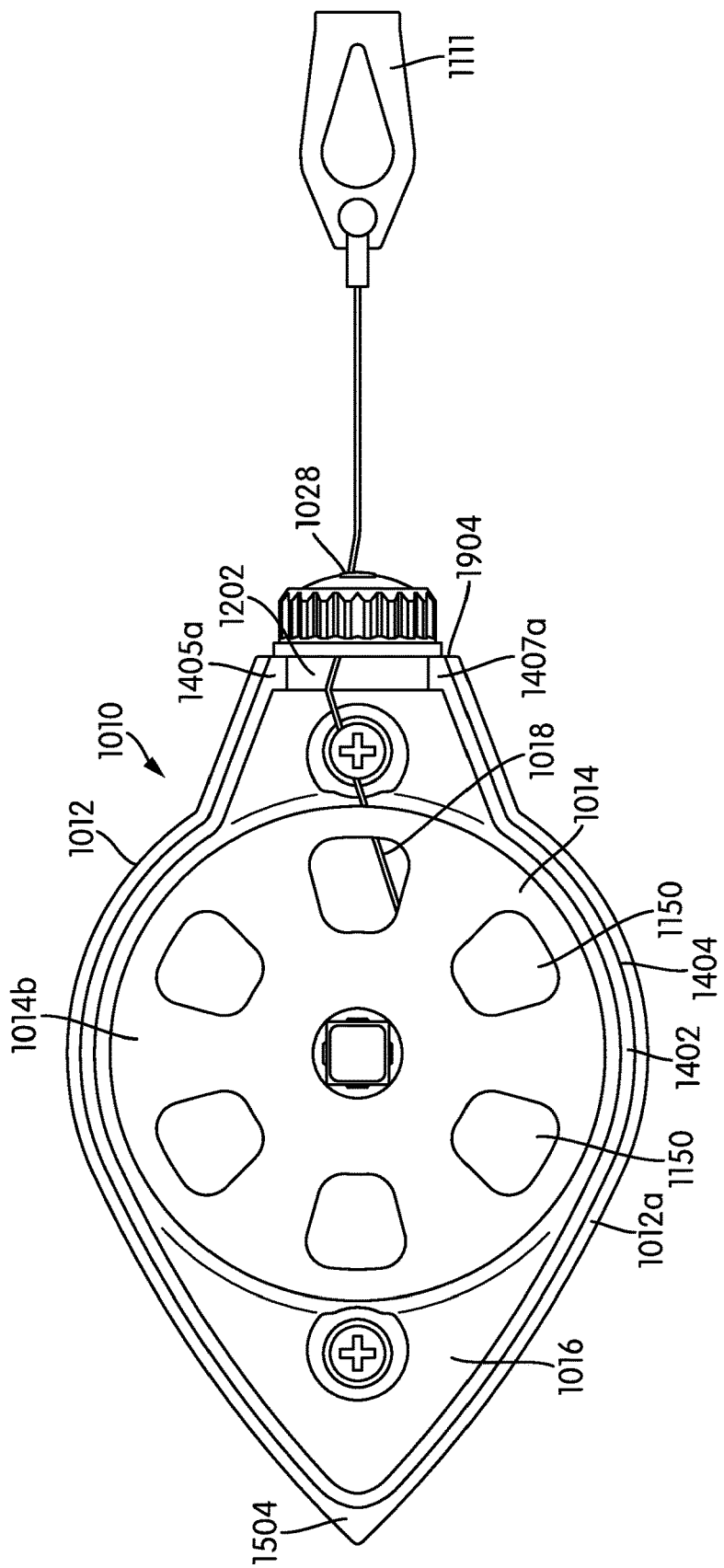
FIGS. 18 and 19 show a left side elevational view and a left side perspective view of the chalk line device in accordance with an embodiment of the present patent application, some of the portions of the chalk line device in FIGS. 18 and 19 are removed to better illustrate the construction of the remaining portions of the chalk line device.
Figure 19:
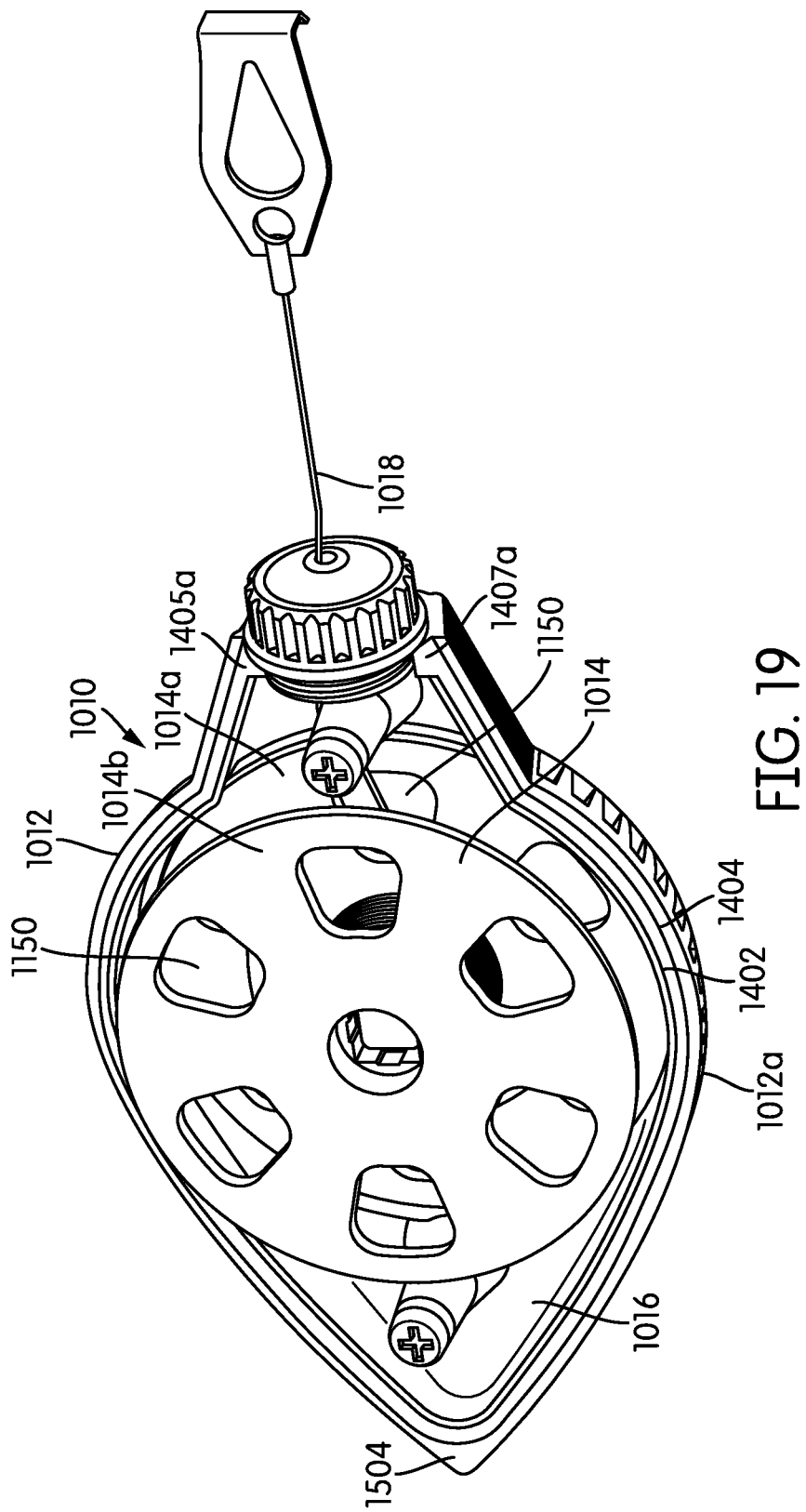
Figure 20:
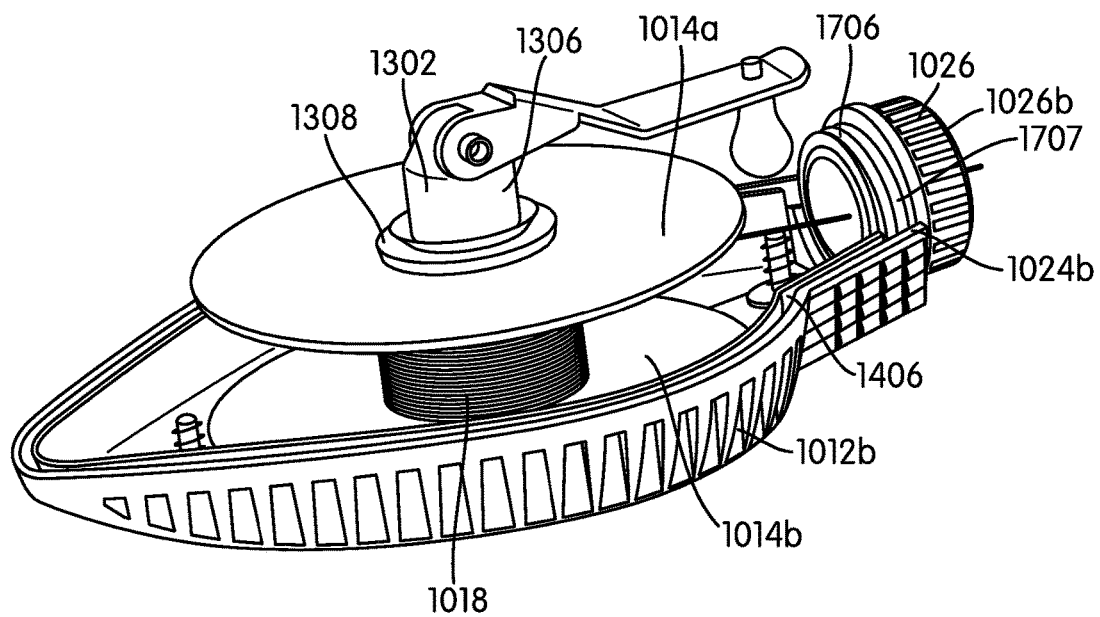
FIG. 20 shows a front perspective view of the chalk line device in accordance with an embodiment of the present patent application, some of the portions of the chalk line device in FIG. 20 are removed to better illustrate the construction of the remaining portions of the chalk line device.

In one embodiment, the housing 1012 is constructed and arranged to prevent the liquid chalk 1022 from leaking from the chalk line opening 1028. In one embodiment, as shown in FIGS. 17 and 18, the chalk line device 1010 includes a line seal 1202 through which the chalk line 1018 passes prior to exiting the housing 1012 through the chalk line opening 1028. In one embodiment, the line seal 1202 removes excess liquid chalk from exiting the housing 1012 through the chalk line opening 1028. In one embodiment, the line seal 1202 is configured to slightly engage with the chalk line 1018 when the chalk line 1018 is extended out of the housing 1012 so as to remove excess liquid chalk from the surfaces of the chalk line 1018 when the chalk line 1018 is being extended out of the housing 1012.

In one embodiment, the line seal or washer 202 may be connected to the housing 1012 by any attachment mechanism as would be appreciated by one skilled in the art. In one embodiment, the attachment mechanism includes, but not limited to, fastening, friction fitting, snap fitting, or adhesive bonding.

In one embodiment, the line seal 1202 may include any shaped configuration as would be appreciated by one skilled in the art and may be made from a material that is configured to effect removing of excess liquid chalk from the chalk line 1018 while still leaving liquid chalk (for marking lines) deposited on the chalk line 1018. In one embodiment, the line seal 1202 may include a rectangular or trapezoidal shaped configuration. In one embodiment, the line seal 1202 may be made of a felt material. In another embodiment, the line seal 1202 may include a fabric material, a cloth material, a material made from compressed animal or synthetic fibers, or any other abrasive granular material as would be appreciated by one skilled in the art.

In one embodiment, the line seal 1202 is configured to engage the chalk line 1018 for removing excess liquid chalk from the chalk line 1018. In one embodiment, the line seal 1202 may include an opening through which the chalk line 1018 is extended. In one embodiment, the diameter of the opening is slightly larger than the diameter of the chalk line 1018 extending there through such that the line seal 1202 allows the chalk line 1018 with liquid chalk deposited thereon to extend through the opening and removes only excess liquid chalk on the chalk line 1018 while still leaving liquid chalk (for marking lines) deposited on the chalk line 1018.

When the user pulls the chalk line hook 1111 attached to the free end of the chalk line 1018, the retractor is configured to allow the chalk line 1018 to be freely extended from the housing 1012 through the chalk line opening 1028. In one embodiment, the reel 1014 is at least partially submerged in the liquid container 1016 such that the liquid chalk is deposited on the chalk line 1018 wound on the reel 1014. In another embodiment, as the chalk line 1018 unwinds from the reel 1014, it passes through the liquid chalk 1022 stored in the liquid container 1016 such that the liquid chalk 1022 is coated on the surfaces of the chalk line 1018. Alternatively, the retractor is also configured to drive the reel 1014 to extend the chalk line 1018 from the housing 1012 through the liquid container 1016 so as to cause the chalk line 1018 to be coated with the chalk 1024 disposed in the liquid container 1016.

The liquid chalk deposited chalk line 1018 wound on the reel 1014 extends through the line seal 1202. As the chalk line 1018 is being extended through the line seal 1202, the line seal or washer 1202 is configured to remove any excess liquid chalk on the surfaces of the chalk line 1018 while still leaving enough chalk material for marking lines deposited on the chalk line 1018. In one embodiment, the line seal 1202 is configured to control the amount of liquid chalk deposited chalk line 1018.

There is less loose chalk debris when the chalk line 1018 is extended from the housing 1012 of the present patent application. By removing the excess liquid chalk from the surfaces of the chalk line 1018 before the chalk line 1018 is extended from the housing 1012, the excess chalk may be returned to the liquid container rather than the excess chalk being accumulated as chalk debris outside the housing 1012. Also, the excess liquid chalk may be returned to the liquid container may be reused later.

Figure 12:
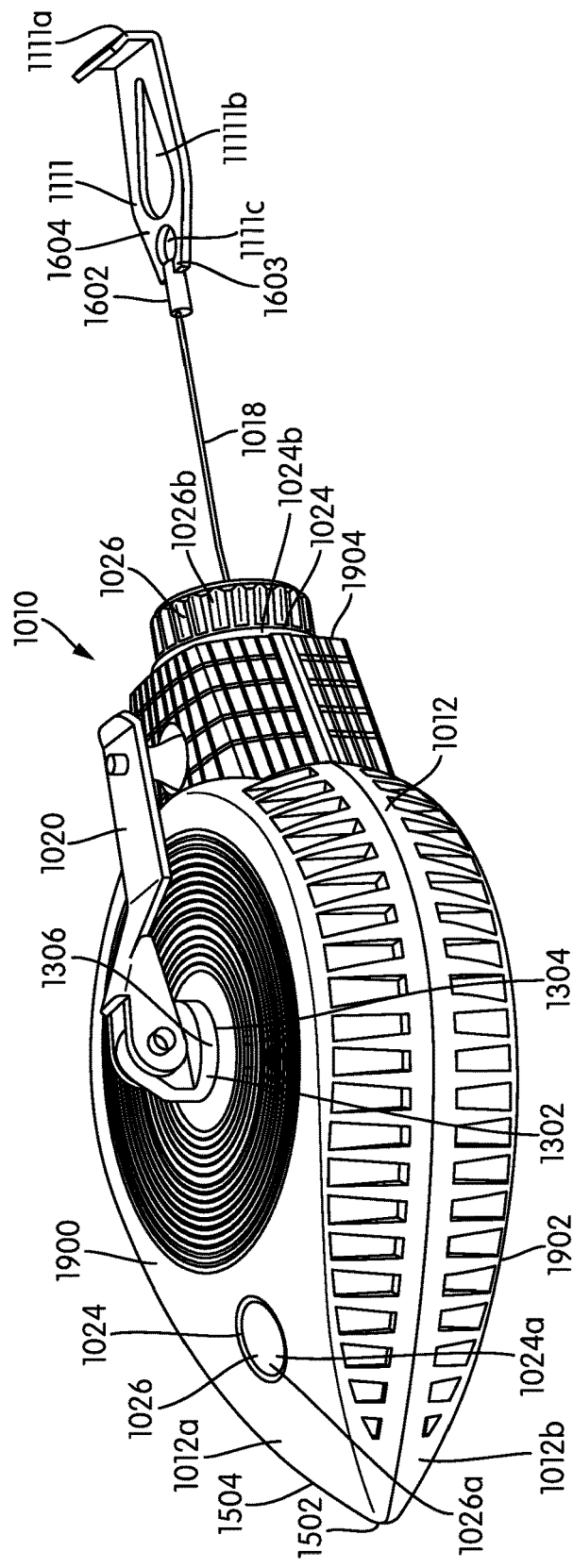
FIG. 12 shows a front perspective view of a chalk line device in accordance with an embodiment of the present patent application.
Figure 13:
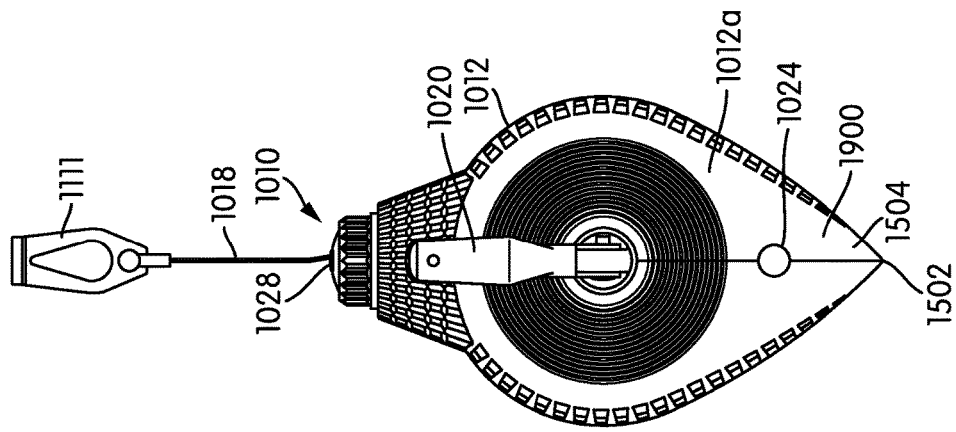
FIGS. 13, 14 and 15 show a left side elevational view, a front elevational view, and a right side elevational view of the chalk line device in accordance with an embodiment of the present patent application.
Figure 14:
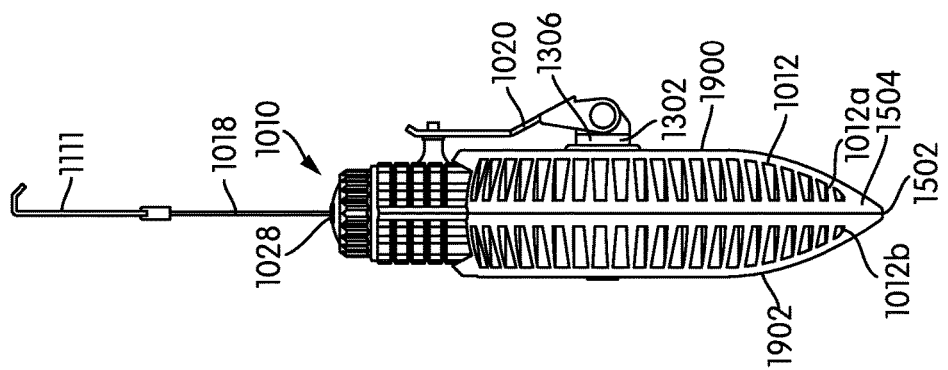
Figure 15:
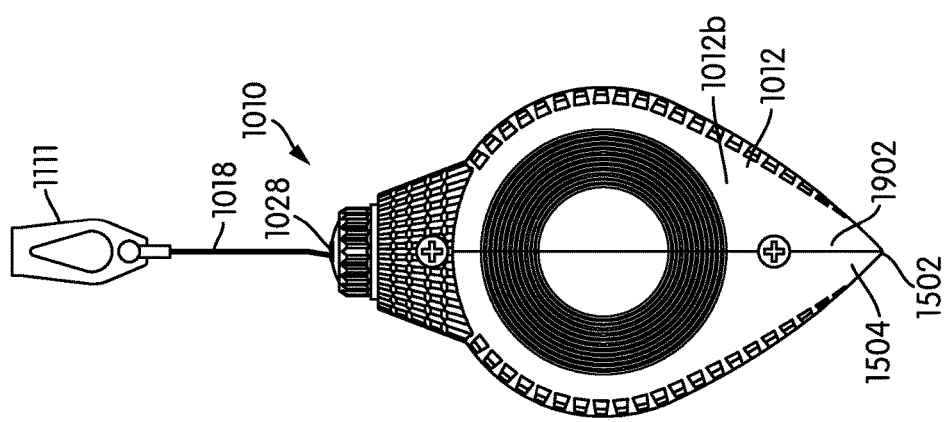
Figure 16:
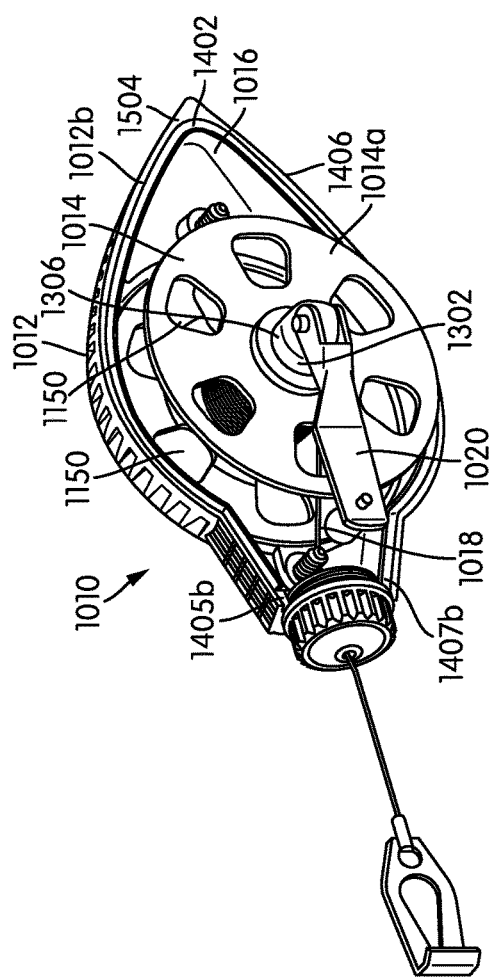
FIGS. 16 and 17 show a right side perspective view and a right side elevational view of the chalk line device in accordance with an embodiment of the present patent application, some of the portions of the chalk line device in FIGS. 16 and 17 are removed to better illustrate the construction of the remaining portions of the chalk line device.

In one embodiment, referring to FIG. 12, the crank shaft 1302 of the retractor is journaled in an opening 1304 in the housing 1012 such that a portion 306 of the crank shaft 1302 extends past the opening 1304 to the outside of the housing 1012. In one embodiment, referring to FIGS. 20 and 21, a seal member 1308 is positioned surrounding the crank shaft 1302 of the retractor and is configured to seal the crank shaft 1302 of the retractor and the housing 1012 in a water or fluid tight sealing relation. In one embodiment, the seal member 1308 is constructed and arranged such that it does not allow the liquid chalk 1022 stored in the liquid container 1016 to leak out from any seams or any openings around the crank shaft 1302 of the retractor.

In one embodiment, the seal member 1308 is configured to stretch over (or be slipped over) the crank shaft 1302 of the retractor or to be press fit on the crank shaft 1302 of the retractor. In one embodiment, the seal member 1308 is configured to rotate with the crank shaft 1302 of the retractor.

In one embodiment, referring to FIG. 21, the seal member 1308 includes a body 1310 and an engaging member 1312 that is connected to the body 1310 by a resilient hinge. In one embodiment, the body 1310 of the seal member 1308 is configured to form an interference fit with the crank shaft 1302 of the retractor. In one embodiment, the engaging member 1312 of the seal member 1308 is configured to seal axially against a surface of the housing 1012 (e.g., perpendicular to the crank shaft 1302 of the retractor). In one embodiment, the engaging member 1312 of the seal member 1308 is configured to seal axially against an inner surface of the housing 1012 (e.g., that is facing the reel 1014). In one embodiment, the engaging member 1312 may include a conical shaped sealing lip member. In one embodiment, the seal member 1308 is made of a rubber material. In one embodiment, the seal member 1308 is made of an elastomeric material. In one embodiment, the seal member 1308 is made of a nitrile rubber material that provides good wear and chemical resistance.

In one embodiment, the liquid container 1016 and the housing 1012 are both constructed and arranged such that they do not allow the liquid chalk 1022 stored in the liquid container 1016 to leak out from any seams, any openings or from a nose portion/the chalk line opening 1028 of the housing 1012 where the chalk line 1018 exits and from around the retractor.

In one embodiment, the composition of the liquid chalk 1022 includes water or alcohol, powdered chalk particles, and a stabilizing agent. In one embodiment, the liquid chalk composition of the liquid chalk 1022 includes the water or alcohol comprising 60% to 95% by volume, the powdered chalk particles comprising 5% to 40% by volume, wherein 90% of the powdered chalk particles range in their maximum dimension from 10 microns to 200 microns, and the stabilizing agent comprising 4% to 25% by volume. In one embodiment, the liquid chalk composition of the liquid chalk 1022 is configured to enable even distribution of the liquid chalk 1022 on the chalk line 1018. In one embodiment, water within the liquid chalk 1022 is configured to penetrate more deeply into the chalk line 1018 than the powdered chalk particles.

In one embodiment, the maximum dimension of the powdered chalk particle in the liquid chalk 1022 may refer to a maximum cross-sectional dimension taken through the widest portion of the powdered chalk particle. In one embodiment, the maximum dimension of the powdered chalk particle in the liquid chalk 1022 may refer to the largest or longest distance between two boundaries of the powdered chalk particle. In one embodiment, the maximum dimension of the powdered chalk particle in the liquid chalk 1022 may refer to the largest or longest linear dimension of the powdered chalk particle. In one embodiment, the maximum dimension of the powdered chalk particle in the liquid chalk 1022 may refer to the largest or longest diameter of the powdered chalk particle.

In one embodiment, the percent volume composition of various components of the liquid chalk 1022 are up to 10 percent greater than or up to 10 percent less than those noted above. In one embodiment, the percent volume composition of various components of the liquid chalk 1022 are up to 5 percent greater than or up to 5 percent less than those noted above. In one embodiment, the percent volume composition of various components of the liquid chalk 1022 are up to 15 percent greater than or up to 15 percent less than those noted above. In one embodiment, the percent volume composition of various components of the liquid chalk 1022 are up to 20 percent greater than or up to 20 percent less than those noted above.

In one embodiment, the water or alcohol in the liquid chalk composition comprises 70% to 85% by volume. In another embodiment, the water or alcohol in the liquid chalk composition comprises 75% to 80% by volume. In one embodiment, any other liquids may be used in place of water.

In one embodiment, when the liquid content of the liquid chalk 1022 evaporates completely, only powdered chalk particles are left in the housing 1012 with minimum or no clumping effect. In one embodiment, there is no chalk clumping when the liquid content of the liquid chalk 1022 is low.

In one embodiment, the powdered chalk particles in the liquid chalk composition comprise 5% to 30% by volume. In one embodiment, the powdered chalk particles in the liquid chalk composition comprise 10% to 15% by volume. In one embodiment, the powdered chalk particles in the liquid chalk composition comprise 15% to 30% by volume. In one embodiment, the powdered chalk particles in the liquid chalk composition comprise 20% to 25% by volume.

In one embodiment, the stabilizing agent in the liquid chalk composition comprises 9% to 20% by volume. In another embodiment, the stabilizing agent in the liquid chalk composition comprises 12% to 17% by volume.

In one embodiment, the liquid chalk 1022 may include 15% by volume of the powdered chalk particles, 8% by volume of the stabilizing agent, and 77% by volume of water or liquid. In one embodiment, the liquid chalk 1022 may include 15-20% by volume of the powdered chalk particles and 80-85% by volume of the alcohol.

In one embodiment, the stabilizing agents may include any additive that is configured to control and/or stabilize chalk particle distribution in the liquid chalk 1022. In one embodiment, the liquid chalk 1022 may include two or more stabilizing agents.

In one embodiment, the liquid chalk 1022 suitable for use in the present patent application can be composed of the water, the powdered chalk particles and the stabilizing agents, although the liquid chalk may be of different types and/or contain other components such as minor impurities arising from deposition or mining. Chalk preparations, in some embodiments, may also include additional ingredients including, but not limited to, binding agents, drying agents, or inert ingredients. For example, in some embodiments, the liquid chalk 1022 may include components that facilitate easy removal of an applied chalk line. In an embodiment, the liquid chalk 1022 may include anti-caking components therein, which may maintain a powdery consistency to the chalk upon the liquid chalk 1022 drying as an applied chalk line. In various embodiments, the added components to the chalk composition may be in powdered form, or may be in the form of a liquid additive to the liquid chalk 1022. In one embodiment, the liquid chalk 1022 may comprise up to 20% of other powdered materials with particles ranging in their maximum dimension from 20 microns to 100 microns. For example, in one embodiment, talc may be added in the composition of the liquid chalk 1022. Additives such as talc may facilitate easy removal of an applied chalk line and/or provide waterproofing properties. For example, in one embodiment, the liquid chalk 1022 may comprise approximately 15% chalk, approximately 15% talc, and approximately 70% water and/or alcohol. It may be appreciated that broader ranges of chalk powder and/or additive powders or liquids may also be used in some embodiments. For examples in some embodiments, the liquid chalk may comprise approximately 10 to 20% chalk, approximately 10 to 20% talc, and the balance being additional liquid or powdered additives with an associated liquid (e.g. water and/or alcohol).

In one embodiment, the drying time of the liquid chalk 1022 on the chalk line 1018 may be in the range between about 2.5 minutes and about 5 minutes, for example, at a temperature of 60° F. In one embodiment, the drying time of the liquid chalk 1022 after snapping the chalk line 1018 less than 2.5 minutes, for example, at a temperature of 60° F.

In one embodiment, the liquid chalk 1022 is configured to withstand the temperature ranges between −55° C. (−67° F.) and 70° C. (158° F.) without degradation. In one embodiment, the chalk line device 1010 is configured to transfer a crisp snapped chalk line at a temperature in the ranges between −20° C. (−4° F.) and 50° C. (122° F.).

In one embodiment, the liquid chalk composition of the liquid chalk 1022 is configured to have a shelf life of about at least 2 years in a closed container and at least 6 months inside the housing 1012 of the chalk line device 1010.

In one embodiment, the chalk line device 1010 with the liquid chalk 1022 is configured to produce minimum of three repeated line snaps of similar length without "recharging" the chalk line 1018. In one embodiment, the chalk line device 1010 is configured to produce a crisp line on both wet and damp surfaces.

In one embodiment, the liquid chalk 1022 may be available in multiple colors. That is, the liquid chalk 1022 may include a colorant. In another embodiment, the liquid chalk 1022 does not contain a colorant. In one embodiment, the liquid chalk 1022 may include a plurality of colorants. Colorants for use in the present patent application may include any colorant suitable for mixing with the liquid chalk 1022 to prepare the desired composition liquid chalk. Colorants may be selected on the basis of desired properties for a given application including hue (color), stability, durability, and penetration. Generally, any colorant known to be suitable for coloring liquid chalk for use in a chalk line device, is suitable for use in the present patent application.

Suitable colorants may be mineral ores, naturally occurring colored pigments, or synthetic dyes including, but not limited to, iron oxides (e.g., hematite), ultramarine, malachite, inks, or synthetic pigments. In one embodiment, synthetic iron oxides in yellow, red, black or brown pigment formulations may be used. It is understood that the term "colorant" as used herein includes colorant preparations that contain other ingredients in addition to the material being used to provide color. It is understood that colorant formulations can be added to the mixture in an amount ranging from about 10% to about 30% by weight, for example, in an amount of about 20% by weight. It is understood that more than one colorant may be used in the compositions and methods of the present patent application.

In one embodiment, the liquid chalk 1022 may be available in a removable version that is configured to provide removable markings on the surface of the work piece or work place. In one embodiment, the removable liquid chalk markings may be easily erased. In another embodiment, the liquid chalk 1022 may be available in a permanent version that is configured to provide permanent markings on the surface of the work piece or work place. In one embodiment, the liquid chalk composition may be available in multiple colors in both removable and permanent versions.

In one embodiment, as shown in FIGS. 12-15, the chalk line device 1010 may include a marker device 1502 for providing markings on surfaces of a work piece or a work place. In one embodiment, the marker device 1502 may include a pen, a pencil, a marker, a highlighter, or any other writing implement that is positioned on an end portion 1504 of the housing 1012.

In one embodiment, the marker device 1502 may include a cover or cap that is configured to releasably secured to the housing 1012 and enclose the writing implement of the marker device 1502. The cap is configured to cover or enclose the writing implement when the marker device 1502 is not in use so as to prevent premature drying of the writing implement. In one embodiment, the cover or cap is constructed and arranged to conform to the shape of the housing 1012.

In one embodiment, the marker device 1502 is not in fluid communication with the liquid chalk 1022 of the liquid container 1016. In another embodiment, the marker device 1502 may be configured for delivery of the liquid chalk 1022 to the surfaces (of the work piece or the work place) to be marked. In one embodiment, the marker device 1502 includes a nib, or a porous member or tip. In one embodiment, the porous member is in fluid communication with the liquid container 1016 and configured to receive the liquid chalk 1022 from the liquid container 1016 via a capillary action. That is, the liquid chalk 1022 moves by the capillary action from the liquid container 1016 to the porous member of the marker device 1502 to provide markings on the surfaces of the work piece or the work place. In another embodiment, the marker device 1502 may include a valve to the liquid container 1016. The valve may be configured to be open when the porous member is pressed against the surface to be marked to allow the flow or delivery of the liquid chalk 1022 from the liquid container 1016 to the porous member of the marker device 1502 to provide markings on the surface. The cap of the marking device 1502 may be configured to cover or enclose its porous member when the marker device 1502 is not in use so as to prevent the evaporation of the liquid chalk 1022 from the liquid container 1016 and premature drying of its porous member.

The present patent application provides chalk that is contained in a liquid form and that upon drying produces a typical chalk mark. In one embodiment, when compared to the powered chalk, the liquid chalk 1022 of the present patent application is configured to reduce the amount of chalk debris outside of the housing 1012 when the chalk line 1018 is extended or retracted. In one embodiment, there will be less loose chalk debris when the chalk line 1018 is extended from or retracted into the housing 1012. The liquid chalk composition helps limit chalk spills while pulling out the chalk line from the housing as well as the chalk splatter all around the chalk line when the chalk line is snapped. In one embodiment, the liquid chalk 1022 is configured to be less susceptive to moisture than dry chalk powder which clumps. In one embodiment, the liquid chalk 1022 is configured to operate with the chalk line 1018 even if moisture gets inside the housing 1012. The liquid chalk composition also allows end users to work in damp conditions without worrying about clumping of the chalk inside the box since it already exists in liquid form. In one embodiment, the snapped chalk line is crisp and produces minimum splatter.

In one embodiment, the liquid chalk comprises fine chalk particles mixed within the base liquid material. In one embodiment, the liquid chalk forms a suspension of chalk particles within the base liquid material.

In one embodiment, the chalk line device 1010 may be used with a liquid chalk that forms a powder when exposed to atmosphere. In one embodiment, the liquid chalk provided on the chalk line when the chalk line is extended from the housing forms a powder when exposed to atmosphere. In one embodiment, the chalk line with the liquid chalk provided thereon and extending from the housing through the chalk line opening is configured to be wet. In one embodiment, the liquid chalk provided on the chalk line is configured to dry when exposed to the atmosphere to form the powder chalk such that the powder chalk on the chalk line is deposited or discharged onto a surface when the chalk line is snapped. In one embodiment, the liquid chalk (or wet chalk) disposed inside the housing dries to form chalk powder when the chalk line is extended from the housing and exposed to atmosphere, air or Ultra Violet (UV) rays. In one embodiment, the liquid chalk becomes powder after exposure to the atmosphere. The liquid chalk transforms to a solid state (powder) chalk when the chalk line is extended from the housing and exposed to a flow or stream of air or other gases. In one embodiment, the chalk line is extended wet and the liquid chalk dries within seconds and allows the chalk to come off the chalk line dry or in a powder form when snapped.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A chalk line device, comprising:
   a housing;
   a chalk line;
   a reel mounted for rotation within the housing, the reel constructed and arranged to carry the chalk line wound thereon;
   liquid chalk;

a liquid container disposed within the housing, the liquid container having a sealed configuration and an unsealed configuration, wherein in the unsealed configuration the liquid container is configured to receive the liquid chalk therein, and in the sealed configuration the liquid container substantially seals the liquid chalk received therein, the reel being positioned in the liquid container such that the chalk line wound therein is at least partially submerged in the liquid chalk received in the liquid container, and a handle connected with the reel and extending outside the housing, the handle being operable to wind up the chalk line onto the reel, wherein the liquid chalk comprises a composition comprising:

water or alcohol comprising 60% to 95% by volume;

powdered chalk particles comprising 5% to 40% by volume, wherein 90% of powdered chalk particles range in their maximum dimension from 10 microns to 200 microns; and a stabilizing agent comprising 4% to 25% by volume.

2. The chalk line device of claim 1, wherein the housing has a filler opening, and wherein the filler opening is configured to receive the liquid chalk therethrough for receipt into the liquid container.

3. The chalk line device of claim 2, further comprising a seal structure configured to selectably seal the filler opening in a water tight sealing relation.

4. The chalk line device of claim 3, wherein the seal structure comprises a movable door moveable between the sealed configuration and the unsealed configuration.

5. The chalk line device of claim 1, wherein the housing comprises a chalk line opening, and wherein the chalk line opening is configured to receive a portion of the chalk line therethrough.

6. The chalk line device of claim 5, further comprising a line seal through which the chalk line passes prior to exiting the housing through the chalk line opening, wherein the line seal removes excess liquid chalk from exiting the housing through the chalk line opening.

7. The chalk line device of claim 1, wherein the chalk line comprises a composition of cotton and nylon material, and wherein the chalk line is at least partially water absorbent.

8. The chalk line device of claim 7, wherein the water within the liquid chalk composition penetrates more deeply into the chalk line than the powdered chalk particles.

9. The chalk line device of claim 1, wherein the liquid chalk further comprises an anti-caking component.

10. The chalk line device of claim 9, wherein the anti-caking component is configured to maintain a powdery consistency to the chalk upon the liquid chalk drying as an applied chalk line.

11. A liquid chalk composition comprising:

water or alcohol comprising 60% to 95% by volume;

powdered chalk particles comprising 5% to 40% by volume, wherein 90% of powdered chalk particles range in their maximum dimension from 10 microns to 200 microns; and a stabilizing agent comprising 4% to 25% by volume.

12. The liquid chalk composition of claim 11, wherein the water or alcohol comprises 70% to 85% by volume.

13. The liquid chalk composition of claim 11, wherein the water or alcohol comprises 75% to 80% by volume.

14. The liquid chalk composition of claim 11, wherein the powdered chalk particles comprise 15% to 30% by volume.

15. The liquid chalk composition of claim 11, wherein the powdered chalk particles comprise 20% to 25% by volume.

16. The liquid chalk composition of claim 11, wherein the stabilizing agent comprises 9% to 20% by volume.

17. The liquid chalk composition of claim 11, wherein the stabilizing agent comprises 12% to 17% by volume.

18. The liquid chalk composition of claim 11, further comprising talc.

19. The liquid chalk composition of claim 18, wherein the talc comprises 10% to 20% by volume.

20. The liquid chalk composition of claim 11, wherein the powdered chalk particles comprises 10% to 20% by volume, and further comprising talc comprising 10% to 20% by volume.

21. The liquid chalk composition of claim 11, further comprising an anti-caking component.

22. The liquid chalk composition of claim 21, wherein the anti-caking component is configured to maintain a powdery consistency to the chalk upon the liquid chalk drying as an applied chalk line.

* * * * *